United States Patent
Tanabe et al.

(10) Patent No.: US 10,628,926 B2
(45) Date of Patent: Apr. 21, 2020

(54) SIGNAL PROCESSING METHOD AND IMAGING DEVICE

(71) Applicant: SONY CORPORATION, Tokyo (JP)

(72) Inventors: Norihiro Tanabe, Tokyo (JP); Yoshikuni Nomura, Tokyo (JP); Shigeyuki Baba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/768,216

(22) PCT Filed: Sep. 30, 2016

(86) PCT No.: PCT/JP2016/079146
§ 371 (c)(1),
(2) Date: Apr. 13, 2018

(87) PCT Pub. No.: WO2017/104228
PCT Pub. Date: Jun. 22, 2017

(65) Prior Publication Data
US 2019/0206030 A1    Jul. 4, 2019

(30) Foreign Application Priority Data
Dec. 17, 2015    (JP) .................... 2015-245965

(51) Int. Cl.
*G06T 5/00*    (2006.01)
*G02B 7/28*    (2006.01)
(Continued)

(52) U.S. Cl.
CPC .............. *G06T 5/006* (2013.01); *G02B 7/28* (2013.01); *G02B 7/36* (2013.01); *G06T 7/97* (2017.01);
(Continued)

(58) Field of Classification Search
CPC .. G06T 5/006; G06T 7/97; G02B 7/36; H04N 5/2254; H04N 5/23287; H04N 5/23212
(Continued)

(56) References Cited

U.S. PATENT DOCUMENTS

| | | | |
|---|---|---|---|
| 2003/0223007 A1* | 12/2003 | Takane | H04N 5/232 348/335 |
| 2007/0030379 A1* | 2/2007 | Agranov | H04N 5/2254 348/340 |
| 2014/0009631 A1* | 1/2014 | Topliss | G02B 27/646 348/208.11 |

FOREIGN PATENT DOCUMENTS

| | | |
|---|---|---|
| JP | 11-027702 A | 1/1999 |
| JP | 11-27702 A | 1/1999 |

(Continued)

OTHER PUBLICATIONS

International Search Report and Written Opinion of PCT Application No. PCT/JP2016/079146, dated Nov. 29, 2016, 09 pages.

*Primary Examiner* — Yogesh K Aggarwal
(74) *Attorney, Agent, or Firm* — Chip Law Group

(57) ABSTRACT

There is provided a signal processing method including calculating, by a processor, a distortion correction parameter on a basis of a correlation between a chief ray angle (CRA) for an image height inside a pixel and a relative position of a lens in an optical axis direction to an imaging element, the relative position being changed by an actuator. In addition, there is provided an imaging device including an image calculation unit that converts an image by using a distortion correction parameter calculated on a basis of a correlation between a chief ray angle for an image height inside a pixel and a relative position of a lens in an optical axis direction to an imaging element, the relative position being changed by an actuator.

10 Claims, 20 Drawing Sheets

(51) Int. Cl.
  *H04N 5/232*     (2006.01)
  *G06T 7/00*      (2017.01)
  *G02B 7/36*      (2006.01)
  *H04N 5/225*     (2006.01)

(52) U.S. Cl.
  CPC ........... *H04N 5/2254* (2013.01); *H04N 5/232* (2013.01); *H04N 5/23212* (2013.01); *H04N 5/23287* (2013.01)

(58) Field of Classification Search
  USPC ................ 348/335, 340, 345, 348, 350, 352
  See application file for complete search history.

(56) References Cited

FOREIGN PATENT DOCUMENTS

| | | |
|---|---|---|
| JP | 2002-232920 A | 8/2002 |
| JP | 2004-354572 | 12/2004 |
| JP | 2004-354572 A | 12/2004 |
| JP | 2005-010295 A | 1/2005 |
| JP | 2011-033990 A | 2/2011 |
| JP | 2011-097131 A | 5/2011 |

\* cited by examiner

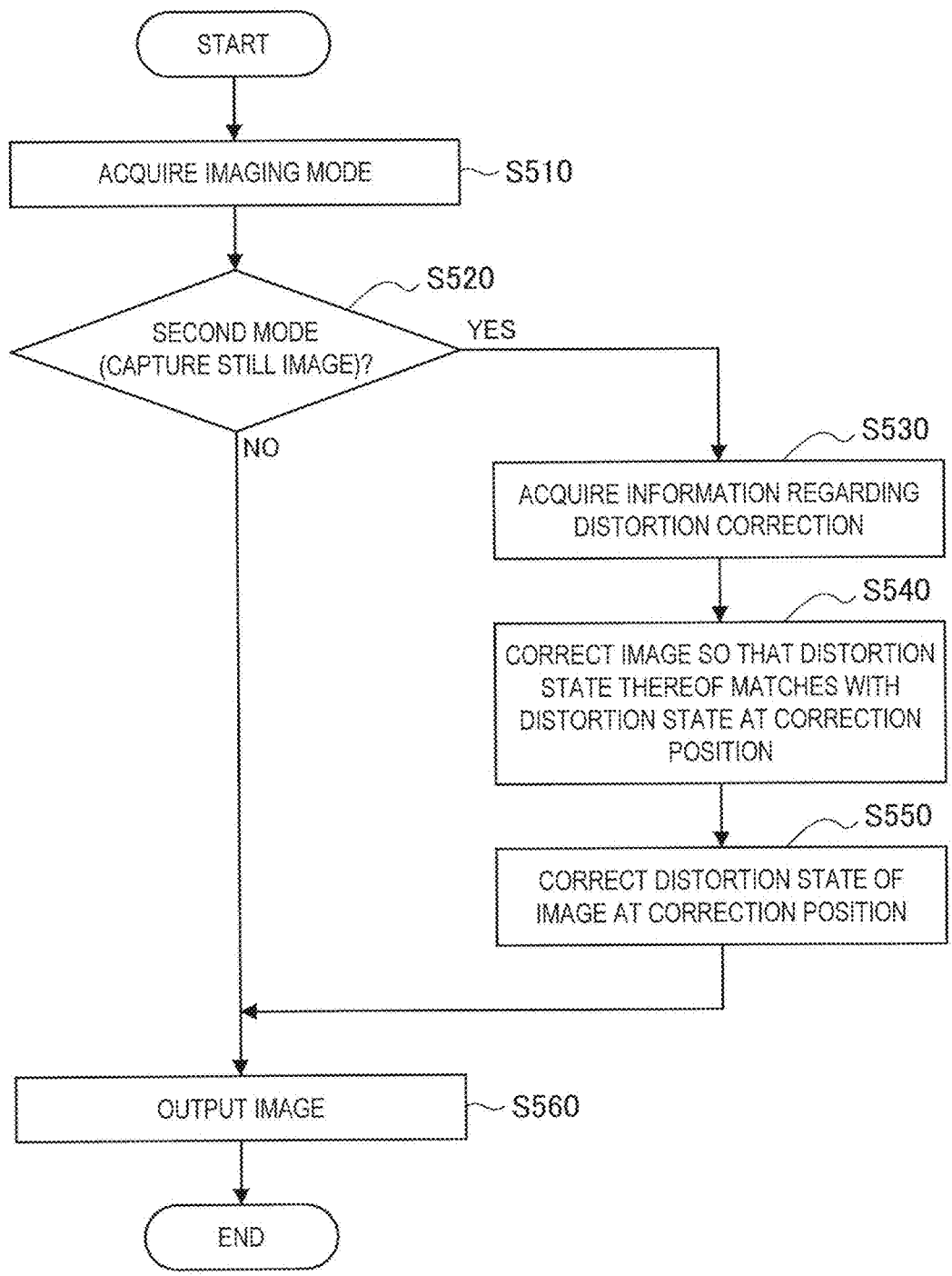

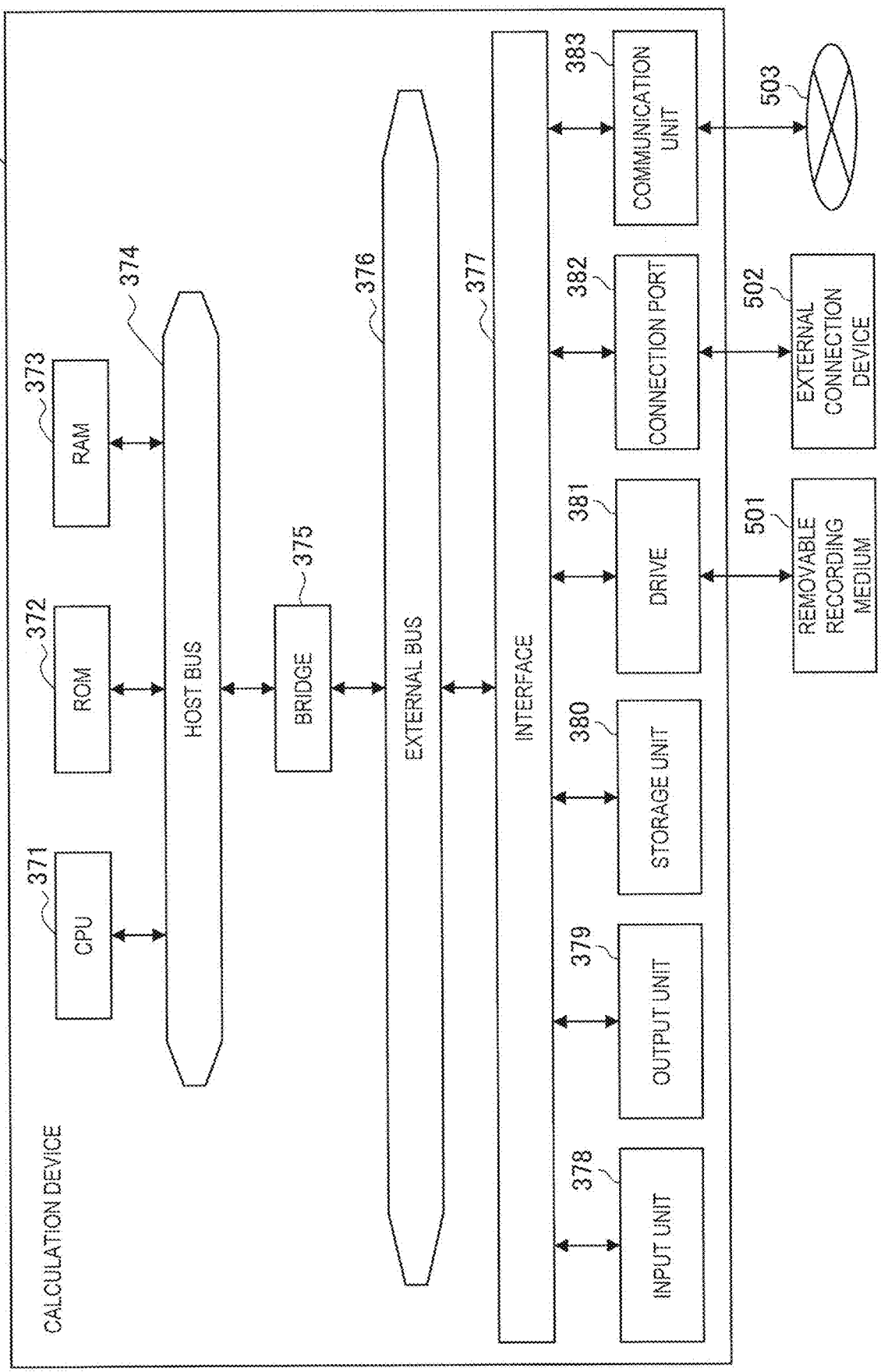

SIGNAL PROCESSING METHOD AND IMAGING DEVICE

CROSS REFERENCE TO RELATED APPLICATIONS

This application is a U.S. National Phase of International Patent Application No. PCT/JP2016/079146 filed on Sep. 30, 2016 which claims priority benefit of Japanese Patent Application No. JP 2015-245965 filed in the Japan Patent Office on Dec. 17, 2015. Each of the above-referenced applications is hereby incorporated herein by reference in its entirety.

TECHNICAL FIELD

The present disclosure relates to a signal processing method and an imaging device.

BACKGROUND ART

Generally, a distortion is generated in a peripheral portion of an image captured by an imaging device due to a phenomenon called "lens distortion" caused by a lens characteristic. Further, in digital cameras that have been diffused in recent years, there is known a technology for reducing a distortion of an image by performing processing for correcting a lens distortion peculiar to a lens. The above-mentioned technology is, for example, a method of calculating a correction parameter disclosed in Patent Literature 1.

CITATION LIST

Patent Literature

Patent Literature 1: JP 2002-232920A

DISCLOSURE OF INVENTION

Technical Problem

However, driving a lens by using an autofocus function is not considered in the method disclosed in Patent Literature 1. Therefore, the method disclosed in Patent Literature 1 cannot be applied as it is to digital cameras having an autofocus function of driving a lens and automatically adjusting a focus of a camera module.

In view of this, the present disclosure proposes a signal processing method and an imaging device, each of which is new, is improved, and is for processing distortion states of images captured at different lens positions.

Solution to Problem

According to the present disclosure, there is provided a signal processing method including, by a processor: calculating a distortion correction parameter on a basis of a correlation between a chief ray angle for an image height inside a pixel and a relative position of a lens in an optical axis direction to an imaging element, the relative position being changed by an actuator.

In addition, according to the present disclosure, there is provided an imaging device including: an image calculation unit configured to convert an image by using a distortion correction parameter calculated on a basis of a correlation between a chief ray angle for an image height inside a pixel and a relative position of a lens in an optical axis direction to an imaging element, the relative position being changed by an actuator.

Advantageous Effects of Invention

As described above, according to the present disclosure, it is possible to efficiently process distortion states of images captured at different lens positions. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 19 is a flowchart showing an execution and determination procedure of distortion correction according to a third embodiment.

FIG. 20 is a diagram illustrating a hardware configuration example of a correction parameter calculation device according to the present disclosure.

MODE(S) FOR CARRYING OUT THE INVENTION

Figure 1:
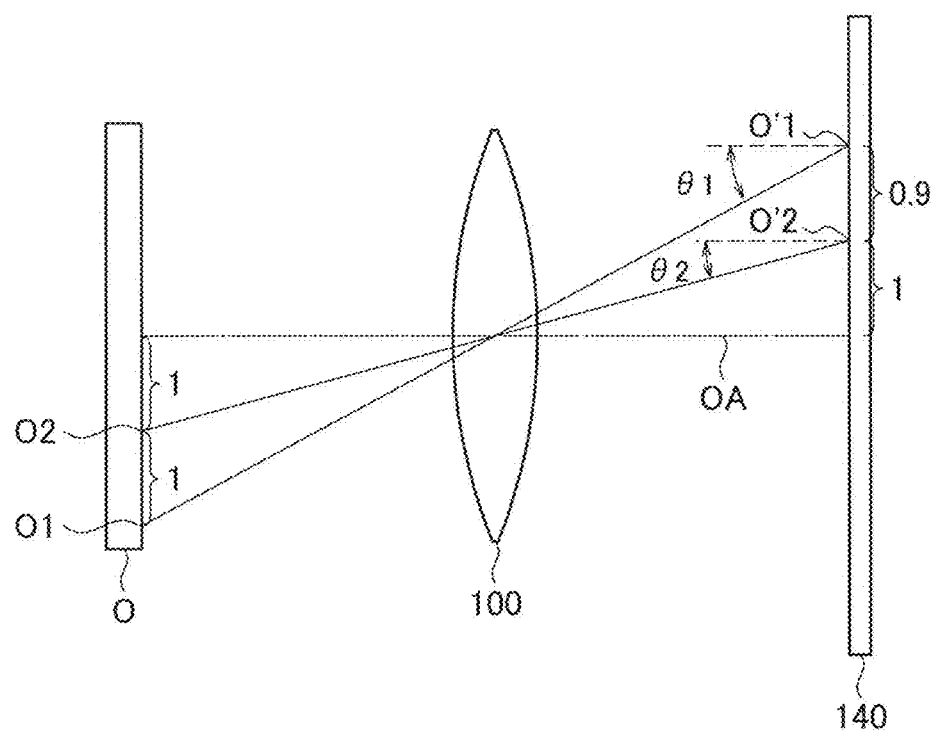
FIG. 1 is a diagram illustrating a CRA that is in proportion to an image height.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Background
   1.1. Example of distortion in camera module
   1.2. Relationship between chief ray angle and distortion
2. First embodiment
   2.1. System configuration example according to present embodiment
   2.2. Configuration of imaging device 20
   2.3. Configuration of correction parameter calculation device 30
   2.4. Calculation of distortion correction parameter
   2.5. Calculation of change amount Δz of lens 210
   2.6. Image correction using distortion correction parameter
   2.7. Accuracy of distortion correction according to present embodiment
   2.8. Effects of signal processing method according to present embodiment
3. Second embodiment
   3.1. Imaging device including plurality of independent modules
   3.2. Control of actuators by plurality of control units
   3.3. Control of plurality of actuators by single control unit
   3.4. Effects of second embodiment
4. Third embodiment
   4.1. Control of distortion correction based on imaging mode
   4.2. Flow of control based on imaging mode
   4.2. Effects of third embodiment
5. Hardware configuration example of correction parameter calculation device 30
6. Conclusion <1. Background>

[1.1. Example of Distortion in Camera Module]

In recent years, there has been known an imaging device (hereinafter, also referred to as "compound eye camera") including two or more independent modules made up of an imaging element, a lens for collecting light to the imaging element, and an actuator for driving the lens in an optical axis direction in order to detect a depth and improve image quality. In the above-mentioned imaging device, images acquired through the respective independent modules are subjected to calculation processing and are combined.

For example, a compound eye camera including two independent modules can detect a depth from a subject by using a parallax between the independent modules. At this time, in a case where distortion states of images acquired by the respective independent modules are different, it is impossible to accurately detect a parallax between the independent modules. Therefore, in order to detect a depth more accurately and combine images with high accuracy, it is necessary that distortions of images generated in the respective independent modules are in the same state.

Further, the above-mentioned compound eye camera has an autofocus function in some cases. A camera module having an autofocus function automatically adjusts a focus by causing the actuator to change a lens position in the optical axis direction.

However, in the camera module having the autofocus function, a chief ray angle (CRA) is not in proportion to an image height in some cases. In other words, in the above-mentioned camera module, different distortions of images are generated depending on the lens position in the optical axis direction. Therefore, it is difficult to correct images captured at different lens positions by using the same distortion correction coefficient.

[1.2. Relationship Between Chief Ray Angle and Distortion]

Herein, a chief ray angle (hereinafter, also referred to as "CRA") based on a lens position in the optical axis direction and a distortion of an image will be described with reference to FIGS. 1 to 4. In examples illustrated in FIGS. 1 to 4, object points O1 and O2 on a subject O, image points O'1 and O'2 on an imaging element 140 corresponding to the respective object points, and a chief ray are shown. Herein, the chief ray is a light ray of light rays emitted from the respective object points, which is the center of a pencil of the light rays passing through a lens 100. Further, in FIGS. 1 to 4, CRAs corresponding to the image points O'1 and O'2 are denoted by θ1 and θ2, respectively. Note that an optical axis OA indicates an axis vertically passing through the center of the lens 100.

Figure 2:
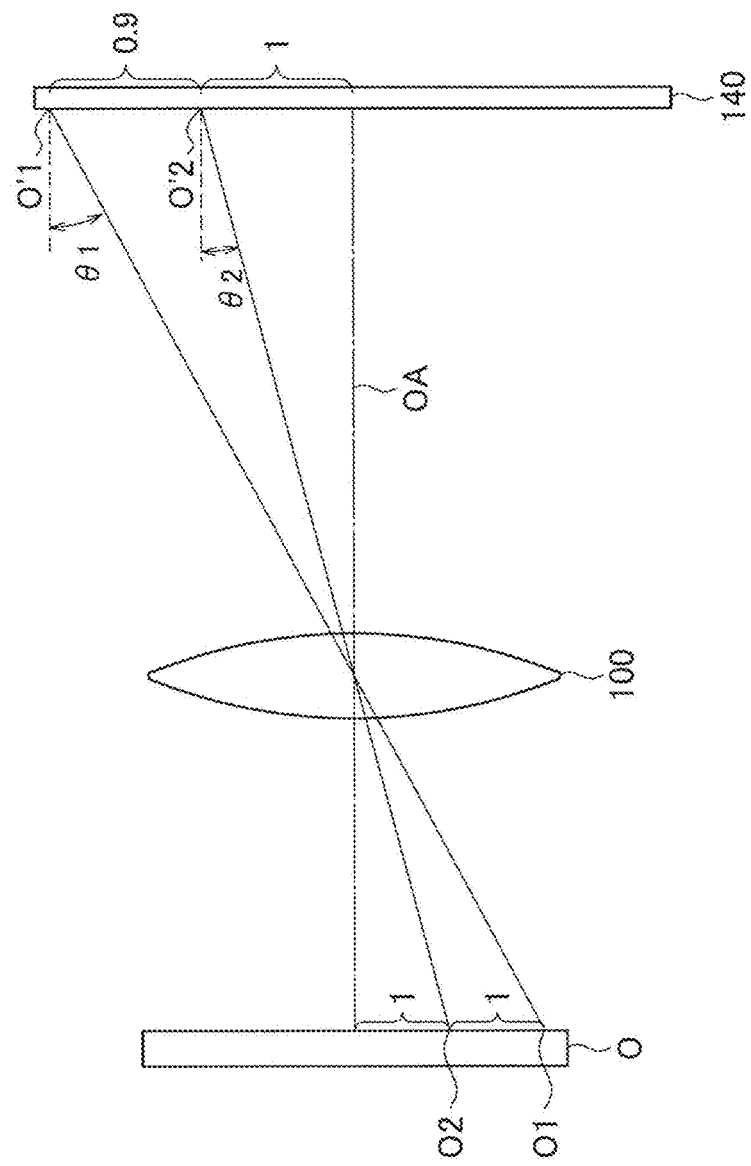
FIG. 2 is a diagram illustrating a CRA that is in proportion to an image height.

First, an example of a camera module in which a CRA is in proportion to an image height will be described with reference to FIGS. 1 and 2. FIGS. 1 and 2 illustrate a case where an image of the subject O is captured at different lens positions by the same camera module, i.e., a case where intervals between the lens 100 and the imaging element 140 are different.

In the examples illustrated in FIGS. 1 and 2, the CRA θ1 for the image point O'1 is larger than the CRA θ2 for the image point O'2 (θ1>θ2). In other words, the CRA is in proportion to the image height in the camera module illustrated in the present example. Therefore, even in a case where the intervals between the lens 100 and the imaging element 140 are different, an image height ratio of the image points O'1 to O'2 has the same values. When referring to FIG. 1, it is found that the image height ratio of the image points O'1 to O'2 is 1.9:1. Further, also in FIG. 2, it is found that the image height ratio of the image points O'1 to O'2 has the same values as those of FIG. 1.

As described above, the CRA is in proportion to the image height in the camera module illustrated in FIGS. 1 and 2. Therefore, even in a case where the intervals between the lens 100 and the imaging element 140 are different, the image height ratio of the image points O'1 to O'2 is not changed. That is, even in a case where the lens position in the optical axis direction is changed by the actuator, captured images are in the same distortion state. Therefore, it is possible to correct distortion states of images captured at any lens positions by using the same correction coefficient.

Next, an example of a camera module in which a CRA is not in proportion to an image height will be described with reference to FIGS. 3 and 4. The camera module according to the present example includes two optical elements, i.e., lenses 100a and 100b, which is different from the examples illustrated in FIGS. 1 and 2. Further, FIGS. 3 and 4 illustrate a case where an image of the subject O is captured at different lens positions by the same camera module, i.e., intervals between the lenses 100a and 100b and the imaging element 140 are different.

In the examples illustrated in the present example, the CRA θ1 for the image point O'1 is smaller than the CRA θ2 for the image point O'2 (θ1<θ2). In other words, the CRA is not in proportion to the image height in the camera module illustrated in the present example. Therefore, in a case where the intervals between the lenses 100a and 100b and the imaging element 140 are different, the image height ratio of the image points O'1 to O'2 is changed. When referring to FIG. 3, it is found that the image height ratio of the image points O'1 to O'2 is 1.5:1. Meanwhile, when referring to FIG. 4, the image height ratio of the image points O'1 to O'2 is 1.2:1, which is different from the case of FIG. 3.

Figure 3:
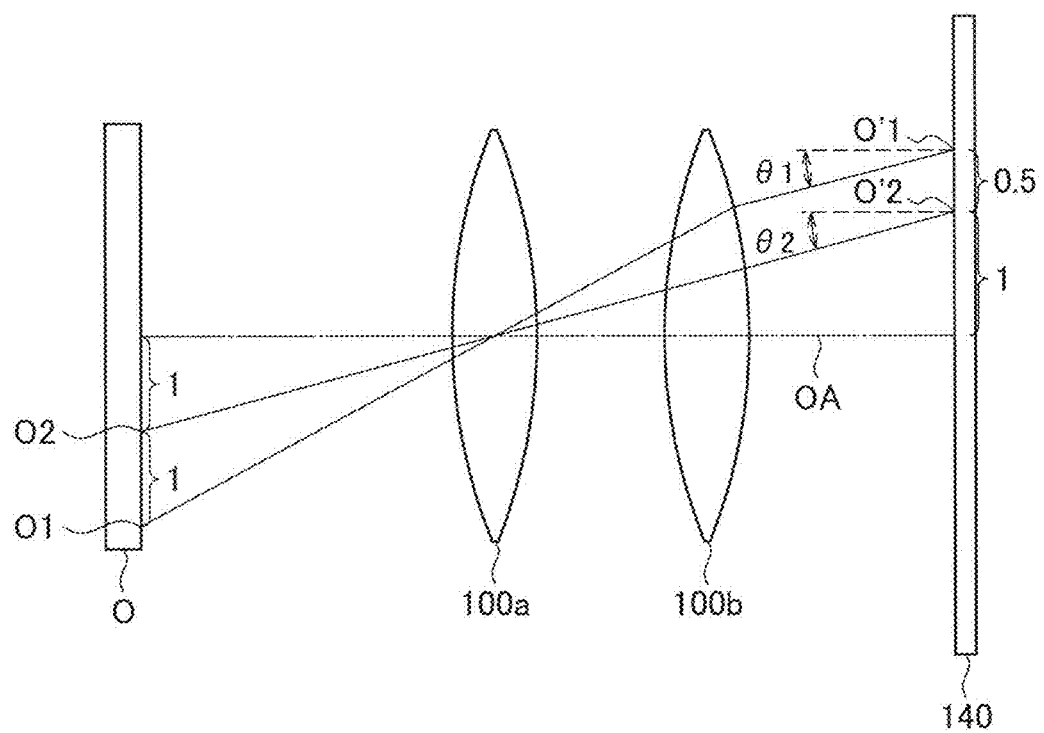
FIG. 3 is a diagram illustrating a CRA that is not in proportion to an image height.
Figure 4:
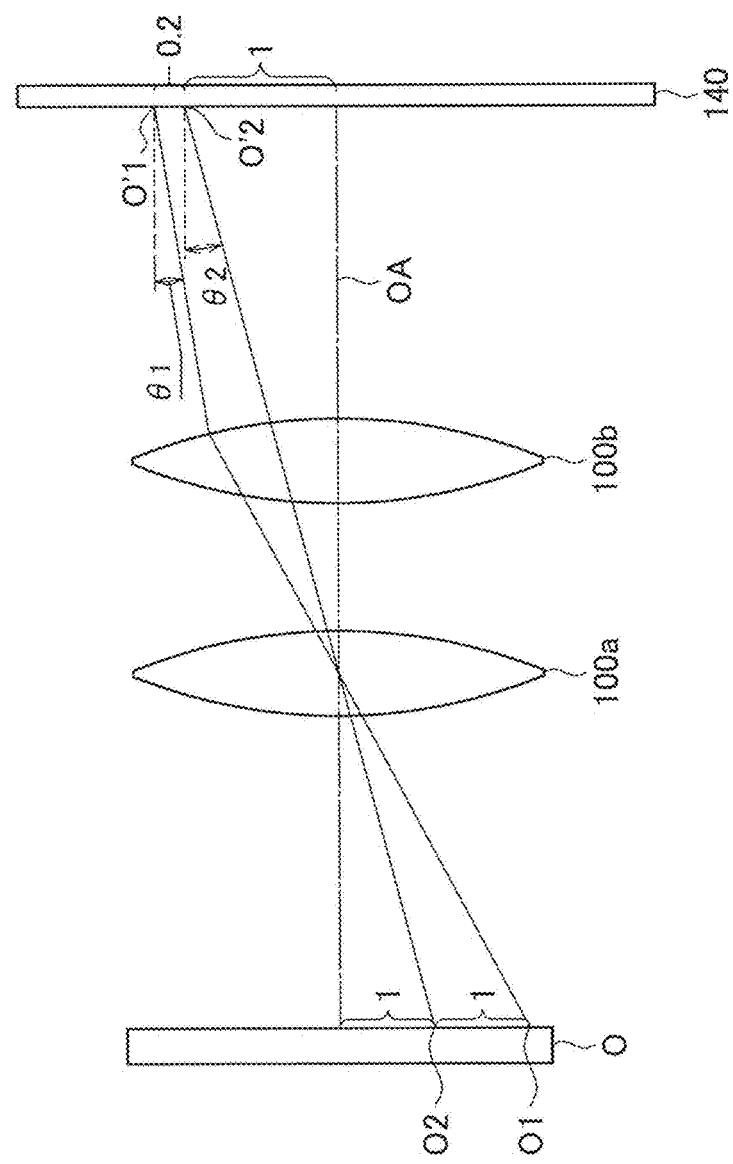
FIG. 4 is a diagram illustrating a CRA that is not in proportion to an image height.

As described above, the CRA is not in proportion to the image height in the camera module illustrated in FIGS. 3 and 4. Therefore, the image height ratio of the image points O'1 to O'2 is changed depending on the interval between the lenses 100a and 100b and the imaging element 140. That is, a distortion state of a captured image is changed as the lens position in the optical axis direction is changed by the actuator. Therefore, it is difficult to correct distortions of images captured at different lens positions by using the same correction coefficient.

Note that, although the example of the camera module including the two optical elements, i.e., the lenses 100a and 100b has been described with reference to FIGS. 3 and 4, a phenomenon in which a CRA is not in proportion to an image height is not limited to such an example. The phenomenon tends to occur in a camera module having a short focal distance and particularly occurs in many cases in a smartphone camera module that is required to be reduced in size. Further, the phenomenon is also greatly influenced by characteristics of lenses, the number of lenses to be used, and the like.

A signal processing method and an imaging device according to the present disclosure have been made in view of the above-mentioned CRA characteristic that is not in proportion to an image height and can calculate a CRA for each image height based on a lens position. In embodiments of the present disclosure described below, features of the signal processing method and the imaging device according to the present disclosure and effects of the features will be described.

<2. First Embodiment>
[2.1. System Configuration Example According to Present Embodiment]

Figure 5:
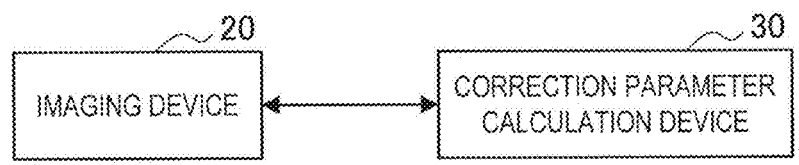
FIG. 5 is a schematic diagram illustrating a signal processing method according to the present disclosure.

First, a system configuration example for implementing a signal processing method according to a first embodiment of the present disclosure will be described with reference to FIG. 5. When referring to FIG. 1, the system for implementing the signal processing method according to the present embodiment includes an imaging device 20 and a correction parameter calculation device 30. Further, the imaging device 20 and the correction parameter calculation device 30 are connected to communicate with each other. Herein, the imaging device 20 according to the present embodiment is a camera module having an autofocus function. Further, the correction parameter calculation device 30 is an information processing device for calculating a correction parameter used to correct a distortion state of the imaging device 20.

A feature of the signal processing method according to the present embodiment is that the correction parameter calculation device 30 extracts information regarding capturing of an image of a subject from the imaging device 20, performs calculation processing, and therefore calculates a distortion correction parameter peculiar to each imaging device 20. For example, by performing the above-mentioned processing at the time of producing the imaging device 20 in a factory, it is possible to detect an individual difference of a product generated due to a tolerance of used components and calculate a distortion correction parameter based on the individual imaging device 20. With this, the imaging device 20 can correct an image by using an appropriate distortion correction parameter at the time of capturing the image after factory shipment.

[2.2. Configuration of Imaging Device 20]

Next, a configuration of the imaging device 20 according to the present embodiment will be described with reference to FIG. 6. As described above, the imaging device 20 according to the present embodiment is a camera module having an autofocus function. The imaging device 20 according to the present embodiment may be, for example, a general digital camera or digital single-lens reflex camera having an autofocus function. Further, the imaging device 20 according to the present embodiment may be an information processing device including a camera module having an autofocus function. For example, the imaging device 20 according to the present embodiment may be a smartphone, mobile phone, or tablet including a camera module having an autofocus function. The signal processing method according to the present embodiment can be widely applied to the above-mentioned devices.

Figure 6:
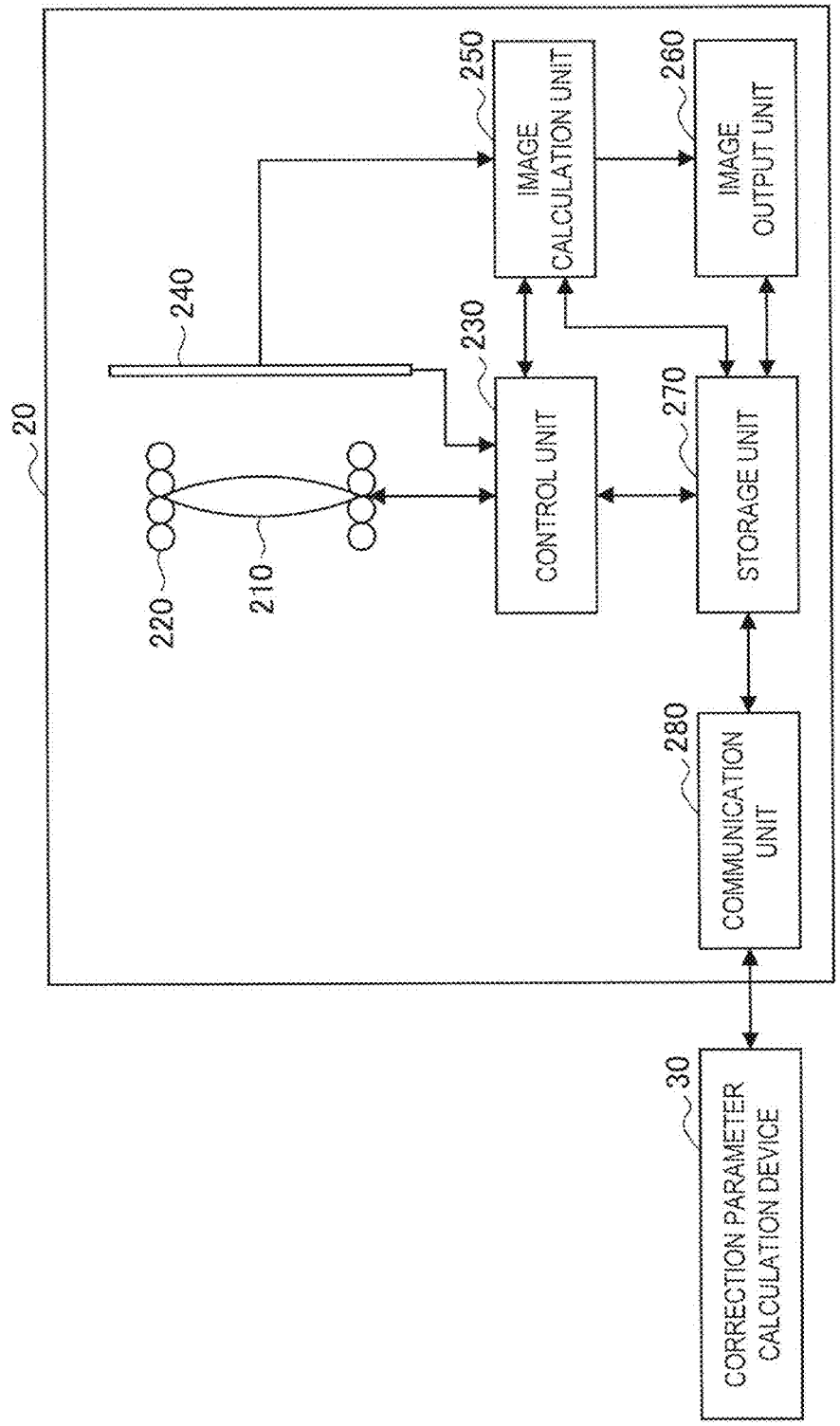
FIG. 6 is a functional block diagram of an imaging device according to a first embodiment of the present disclosure.

When referring to FIG. 6, the imaging device 20 according to the present embodiment includes a lens 210, an actuator 220, a control unit 230, an image acquisition unit 240, an image calculation unit 250, an image output unit 260, a storage unit 270, and a communication unit 280. Note that the imaging device 20 according to the present embodiment is not limited to the above-mentioned configuration example and may further include a configuration in addition to the configuration illustrated in FIG. 6. For example, the imaging device 20 according to the present embodiment may further include a drive (not shown) used to be connected to a removable storage medium (not shown).

(Lens 210)

The lens 210 is an optical element that is provided on a subject side and collects light from the subject to the image acquisition unit 240 described below. Although a single lens is used in the example illustrated in FIG. 6, the lens 210 according to the present embodiment may be a lens group including a plurality of lenses. In addition, the lens to be used is not limited to a biconvex lens. For example, the lens 210 may be a lens group including a plurality of different types of convex lenses and concave lenses. Note that, in a case where the lens 210 is a lens group including a plurality of lenses, the whole lens 210 may be driven by the actuator 220 described below or only a predetermined single lens of the lenses included in the lens 210 may be driven. A configuration of the lens 210 can be appropriately changed in accordance with the camera module and a characteristic of autofocus control. Further, the lens 210 according to the present embodiment may be made from plastic such as glass or organic glass.

(Actuator 220)

The actuator 220 has a function of driving the lens 210 in the optical axis direction. The lens 210 is disposed to be fixed inside the actuator 220. The actuator 220 according to the present embodiment may be, for example, a voice coil motor (VCM) actuator or may be a micro electro mechanical systems (MEMS) actuator.

(Control Unit 230)

The control unit 230 has a function of applying a control signal regarding autofocus control based on a distance between the lens 210 and the subject to the actuator 220 on the basis of a signal from the image acquisition unit 240 described below. The control unit 230 may be formed on an integrated circuit such as an integrated circuit (IC) and a large scale integration (LSI).

(Image Acquisition Unit 240)

The image acquisition unit 240 is an imaging element that converts received light into an electric signal by photoelectric conversion. The image acquisition unit 240 is provided to face the lens 210 in an opposite direction of the subject across the lens 210. The image acquisition unit 240 according to the present embodiment may be, for example, a charge-coupled device (CCD) image sensor. Further, the image acquisition unit 240 may be a complementary metal-oxide-semiconductor (CMOS) image sensor.

(Image Calculation Unit 250)

The image calculation unit 250 has a function of processing image information acquired from the image acquisition unit 240 by signal processing. The image calculation unit 250, as well as the control unit 230, may be formed on an integrated circuit such as an IC and an LSI. Details of signal processing performed by the image calculation unit 250 will be described below.

(Image Output Unit 260)

The image output unit 260 has a function of displaying the image information processed by the image calculation unit 250. The image output unit 260 according to the present embodiment may be achieved by a liquid crystal display (LCD) or an organic light emitting diode (OLED). Further, the image output unit 260 may function as an operation unit that accepts user operation. The function serving as the operation unit is achieved by, for example, a touchscreen.

(Storage Unit 270)

The storage unit 270 has a function of storing control programs and various kinds of information used by the respective constituent members of the imaging device 20. Specifically, the storage unit 270 according to the present embodiment stores a distortion correction parameter that is based on a CRA characteristic peculiar to the imaging device 20 and is calculated by the correction parameter calculation device 30, a program for causing the image calculation unit 250 to perform signal processing, and the like. The storage unit 270 is made up of, for example, a random access memory (RAM), a flash memory, and the like.

(Communication Unit 280)

The communication unit 280 has a function of transmitting the image information acquired by the image acquisition unit 240 and information regarding actuator control performed by the control unit 230 to the correction parameter calculation device 30. Further, the communication unit 280 has a function of causing information regarding the distortion correction parameter that is based on a CRA characteristic peculiar to the imaging device 20 and is received from the correction parameter calculation device 30 to be stored on the storage unit 270. Further, in a case where the imaging device 20 is connected to a device other than the correction parameter calculation device 30, the communication unit 280 may include an interface via which the imaging device 20 communicates with the connection device. Communication between the correction parameter calculation device 30 and other connection devices is performed via wired or wireless connection.

[2.3. Configuration of Correction Parameter Calculation Device 30]

Next, a configuration example of the correction parameter calculation device 30 according to the present embodiment will be described with reference to FIG. 7. The correction parameter calculation device 30 according to the present embodiment is an information processing device for calculating a distortion correction parameter peculiar to the imaging device 20. The correction parameter calculation device 30 may be a personal computer (PC) having the above-mentioned function or may be a special information processing device specific to calculation of a correction parameter of the imaging device 20.

Figure 7:
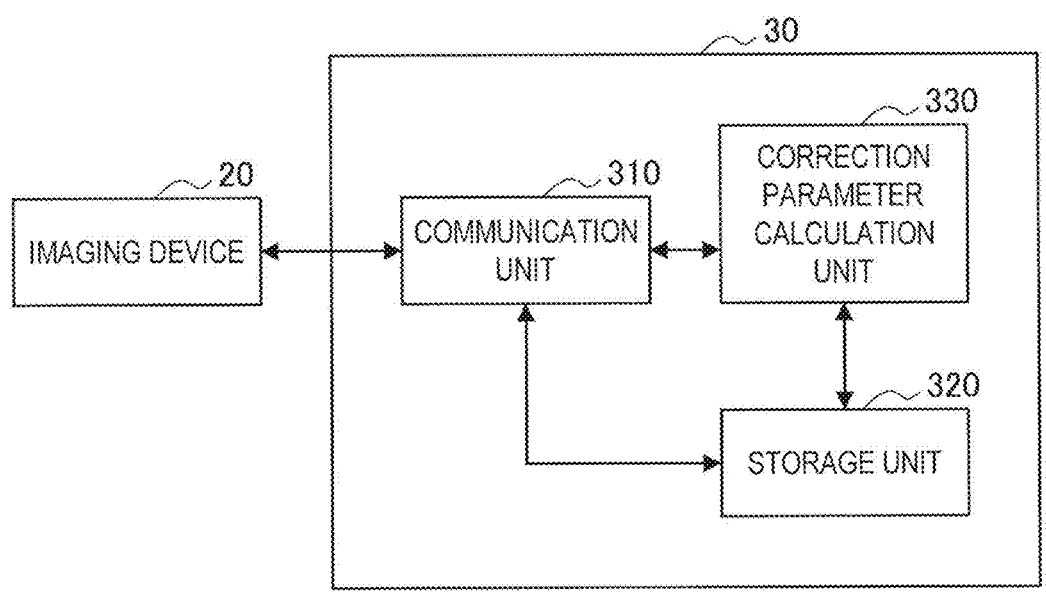
FIG. 7 is a functional block diagram of a correction parameter calculation device according to this embodiment.

FIG. 7 is a functional block diagram of the correction parameter calculation device 30 according to the present embodiment. When referring to FIG. 7, the correction parameter calculation device 30 according to the present embodiment includes a communication unit 310, a storage unit 320, and a correction parameter calculation unit 330.

(Communication Unit 310)

The communication unit 310 has a function of receiving the image information acquired by the image acquisition unit 240 and the information regarding actuator control performed by the control unit 230 from the imaging device 20 and causing the above pieces of information to be stored on the storage unit 320 described below. Further, the communication unit 310 has a function of transmitting, to the imaging device 20, information regarding a distortion correction parameter calculated by the correction parameter calculation unit 330 described below. Further, in a case where the correction parameter calculation device 30 is connected to a device other than the imaging device 20, the communication unit 310 may include an interface via which the correction parameter calculation device 30 communicates with the connection device.

(Storage Unit 320)

The storage unit 320 has a function of storing control programs and various kinds of information used by the respective constituent members of the correction parameter calculation device 30. Specifically, the storage unit 320 according to the present embodiment stores the image information extracted from the imaging device 20, the information regarding actuator control, a program for causing the correction parameter calculation unit 330 to perform calculation processing, and the like. The storage unit 320 is made up of, for example, a RAM, a hard disk drive (HDD), and the like.

(Correction Parameter Calculation Unit 330)

The correction parameter calculation unit 330 has a function of calculating a distortion correction parameter peculiar to each imaging device 20 on the basis of various kinds of information acquired by the communication unit 310. Details of calculation of a correction parameter by the correction parameter calculation unit 330 will be described below.

[2.4. Calculation of Distortion Correction Parameter]

Hereinabove, the configurations of the imaging device 20 and the correction parameter calculation device 30 according to the present embodiment have been described. Next, calculation of a distortion correction parameter by the correction parameter calculation device 30 will be described with reference to FIGS. 8 to 11. A feature of calculation of a distortion correction parameter according to the present embodiment is to obtain a CRA characteristic based on a lens position. Specifically, the correction parameter calculation device 30 detects a difference between distortions in two subject chart images captured at different lens positions and therefore defines a correlation between a lens position and a CRA. Note that, herein, the lens position means a relative position of the lens 210 to the image acquisition unit 240. In other words, it can be said that the CRA characteristic based on the lens position is a CRA characteristic based on an interval between the lens 210 and the image acquisition unit 240. Further, in a case where the lens 210 is a lens group including a plurality of lenses and the whole lens 210 is driven by the actuator, a relative position of a lens closest to the image acquisition unit 240 to the image acquisition unit 240 may be set as the above-mentioned lens position. In a case where the lens 210 is a lens group including a plurality of lenses and only a predetermined single lens is driven by the actuator 220, a relative position of the lens to the image acquisition unit 240 may be set as the above-mentioned lens position.

(Capturing of Image of Subject Chart C)

Figure 8:
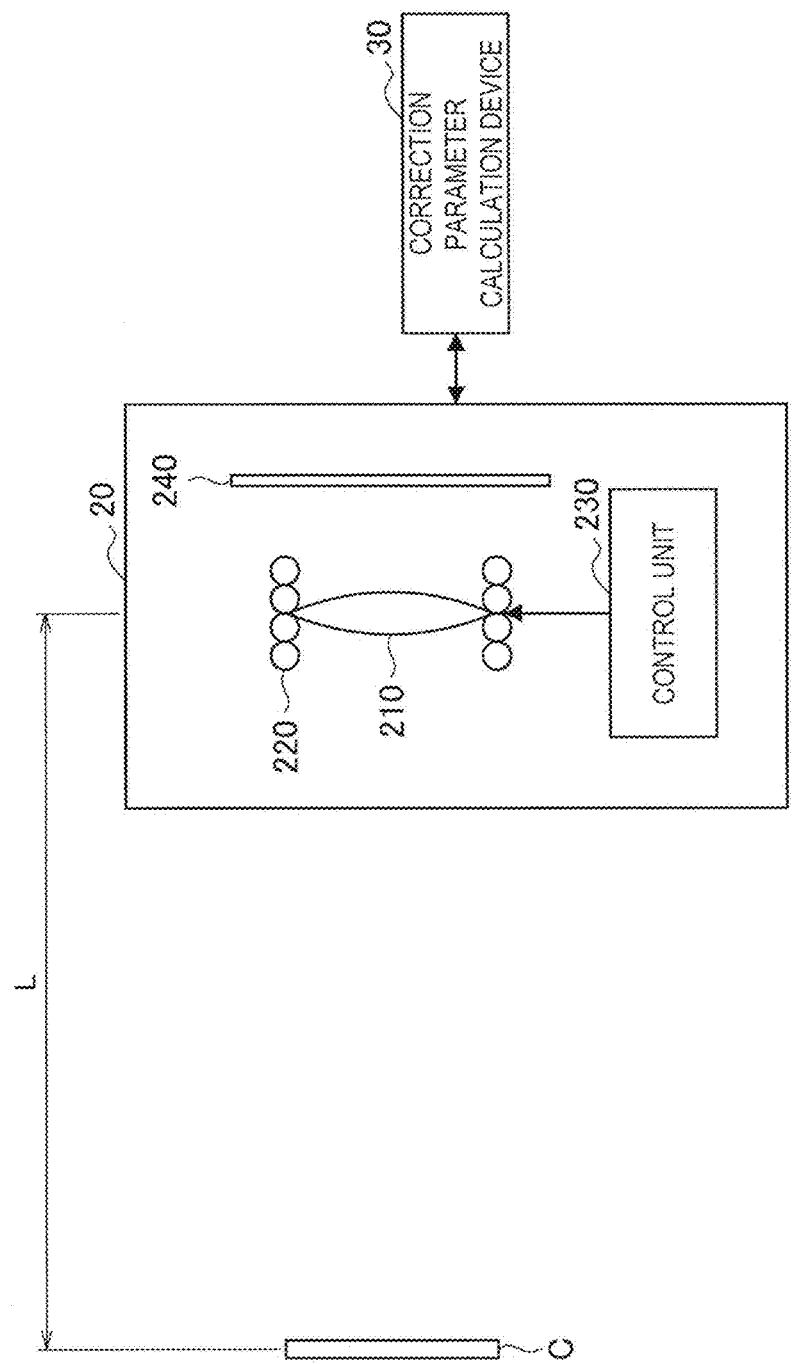
FIG. 8 is a diagram illustrating capturing of an image of a subject chart according to this embodiment.

FIG. 8 is a diagram illustrating capturing of an image of the subject chart C according to the present embodiment. When referring to FIG. 8, the subject chart C according to the present embodiment is disposed at a position distant from the imaging device 20 by an arbitrary subject distance L. In the following description, there will be described a case where an image of the subject chart C is captured in a situation in which the imaging device 20 and the subject chart C are fixed in a state illustrated in FIG. 8. Note that the subject chart C according to the present embodiment may be a check pattern including white and black squares illustrated in FIGS. 14 and 15.

(Calculation of Correlation Between Lens Position and CRA)

Figure 9:
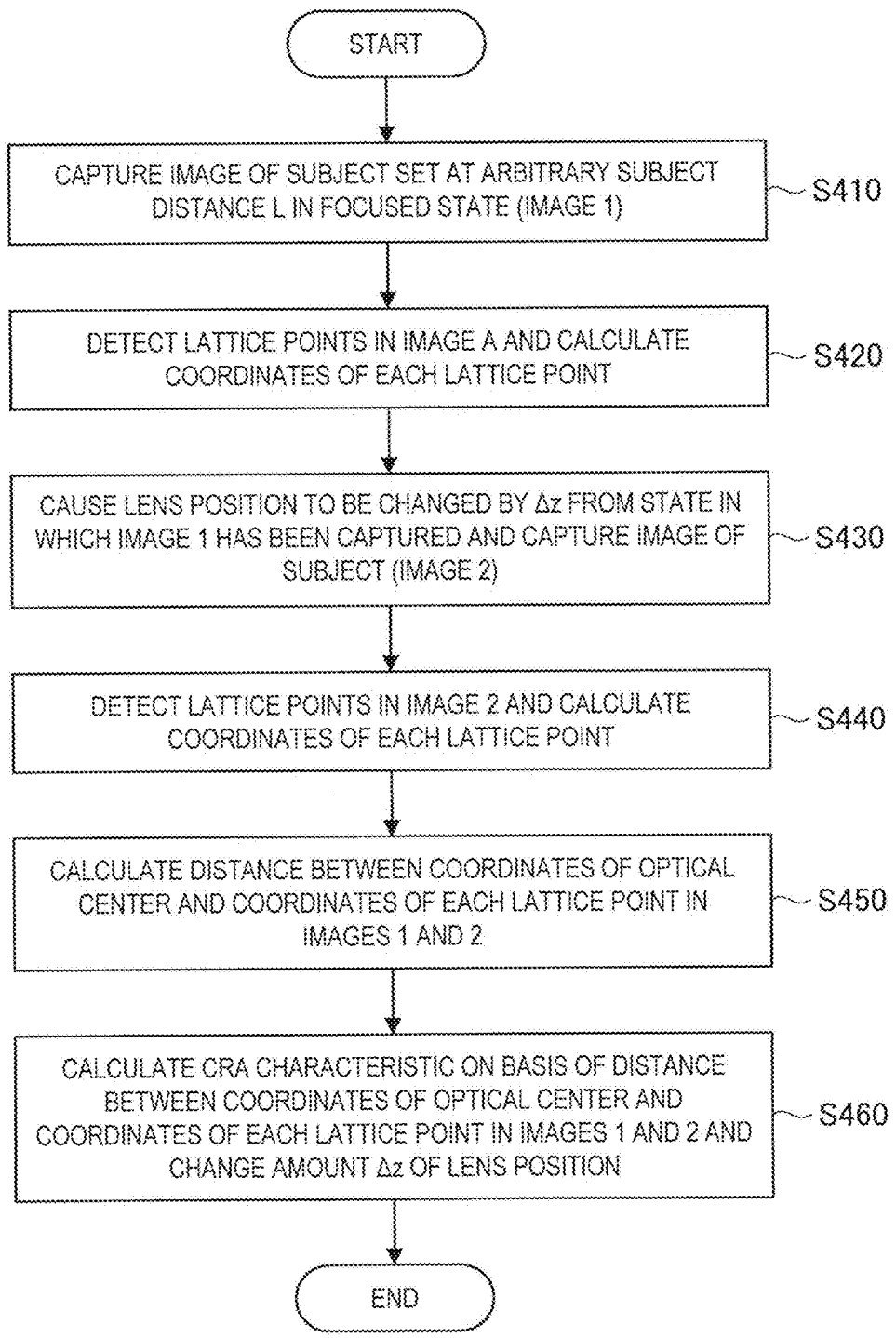
FIG. 9 is a flowchart showing a calculation procedure of a correction parameter according to this embodiment.

Next, a procedure in which the correction parameter calculation unit 330 calculates a correlation between a lens position and a CRA will be described in detail with reference to FIG. 9. FIG. 9 is a flowchart showing a capturing procedure of an image of the subject chart C by the imaging device 20 and a calculation procedure by the correction parameter calculation unit 330.

First, the imaging device 20 captures an image of the subject chart C disposed at the arbitrary subject distance L illustrated in FIG. 8 in a focused state (S410). That is, the control unit 230 of the imaging device 20 controls the actuator 220 by using an autofocus function and causes a lens position to be changed to focus on the subject chart C. At this time, a signal applied to the actuator by the control unit 230 is denoted by "D1". Further, in the following description, the image captured in Step S410 is denoted by "image 1".

Then, the correction parameter calculation device 30 receives information regarding the image 1 from the imaging device 20 and calculates coordinates of each lattice point of the subject chart C in the image 1 (S420). Note that, in a case where the unit of the coordinates of the lattice point is pixel, the correction parameter calculation unit 330 may convert the coordinates of the lattice point into physical coordinates on the basis of a pixel pitch d of the image acquisition unit 240 and use the physical coordinates. At this time, the calculated coordinates of the lattice point are denoted by $(X_i, Y_j)$.

Then, the imaging device 20 causes the lens 210 to move in the optical axis direction from the lens position at which the image 1 has been captured and captures an image of the subject chart C (S430). Specifically, the control unit 230 applies a signal D1+ΔD to the actuator and causes the lens position of the lens 210 to be changed by Δz. As described above, the lens position means a relative position of the lens 210 to the image acquisition unit 240. Note that, in the following description, the change amount Δz indicates a change amount of a lens position that is changed by the actuator 220 to which an arbitrary signal ΔD is applied. In a case where a coefficient for calculating the change amount Δz corresponding to the arbitrary signal ΔD is determined in advance, the change amount Δz of the lens 210 may be calculated by using the coefficient. Further, in the following description, the image captured in Step S430 is denoted by "image 2".

Then, the correction parameter calculation device 30 receives information regarding the image 2 from the imaging device 20 and calculates coordinates of each lattice point of the subject chart C in the image 2 (S440). At this time, the calculated coordinates of the lattice point are denoted by $(X'_i, Y'_j)$. Note that, in the following description, in a case where suffixes in the coordinates of the lattice points calculated on the basis of the image 1 and the image 2 are the same, the coordinates of the respective lattice points are calculated on the basis of the same corresponding point on the subject. Further, matching of the coordinates of the lattice points may be confirmed on the basis of information such as a marker embedded in the subject chart C.

Then, the correction parameter calculation unit 330 calculates a distance between coordinates of the optical center and the coordinates of each lattice point by using the following mathematical expression (1) and the following mathematical expression (2) (S450). Herein, the coordinates of the optical center are denoted by (x, y). The mathematical expression (1) is a mathematical expression for calculating a distance $r_{i,j}$ between the coordinates (x, y) of the optical center and the coordinates $(X_i, Y_j)$ of the lattice point calculated on the basis of the image 1. Further, the mathematical expression (2) is a mathematical expression for calculating a distance $r'_{i,j}$ between the coordinates (x, y) of the optical center and the coordinates $(X'_i, Y'_j)$ of the lattice point calculated on the basis of the image 2. Note that, in a case where the coordinates (x, y) of the optical center are not obtained in advance, the correction parameter calculation unit 330 may calculate $r_{i,j}$ and $r'_{i,j}$ by using coordinates of the center of the image acquisition unit 240.

[Math. 1]

$$r_{i,j} = \sqrt{(X_i-x)^2+(Y_j-y)^2} \quad (1)$$

$$r'_{i,j} = \sqrt{(X'_i-x)^2+(Y'_j-y)^2} \quad (2)$$

Then, the correction parameter calculation unit 330 calculates a CRA corresponding angle $C(r'_{i,j})$ for each $r'_{i,j}$ by using the following mathematical expression (3) on the basis of $r_{i,j}$ and $r'_{i,j}$ calculated on the basis of the mathematical expression (1) and mathematical expression (2) described above and the change amount Δz of the lens 210 (S460). Note that, although the mathematical expression (3) is used to calculate the CRA corresponding angle $C(r'_{i,j})$ in the present example, tan $(C(r'_{i,j}))$ may be obtained herein. By calculating tan $(C(r'_{i,j}))$, it is possible to reduce calculation processing in the following mathematical expression (16).

[Math. 2]

$$\tan(C(r'_{i,j})) = \frac{r'_{i,j} - r_{i,j}}{\Delta z} \quad (3)$$

As described above, the feature of calculation of a distortion correction parameter according to the present embodiment is to obtain a CRA characteristic based on a lens position by using the change amount Δz of the lens 210. With the feature, even in a case where a CRA is not in proportion to an image height in a camera module having an autofocus function, it is possible to detect a degree of a distortion based on a lens position.

[2.5. Calculation of Change Amount Δz of Lens 210]

In the above description regarding calculation of a distortion correction parameter, there has been described a case where a coefficient for calculating the change amount Δz of the lens 210 obtained when the arbitrary signal ΔD is applied is determined in advance. Herein, a method of calculating the change amount Δz of the lens 210 in a case where the coefficient is not determined will be described with reference to FIGS. 10 and 11.

In a case where a focal distance and the subject distance are already known, the imaging device 20 according to the present embodiment can calculate a distance between the lens 210 and the image acquisition unit 240 by using a lens equation. Specifically, it is possible to calculate the change amount Δz of the lens 210 by obtaining a difference between signal amounts to be applied to the actuator 220, the signal amounts being obtained in a case where an image is captured at two different subject distances L and L', and a difference between distances between the lens 210 and the image acquisition unit 240.

Figure 10:
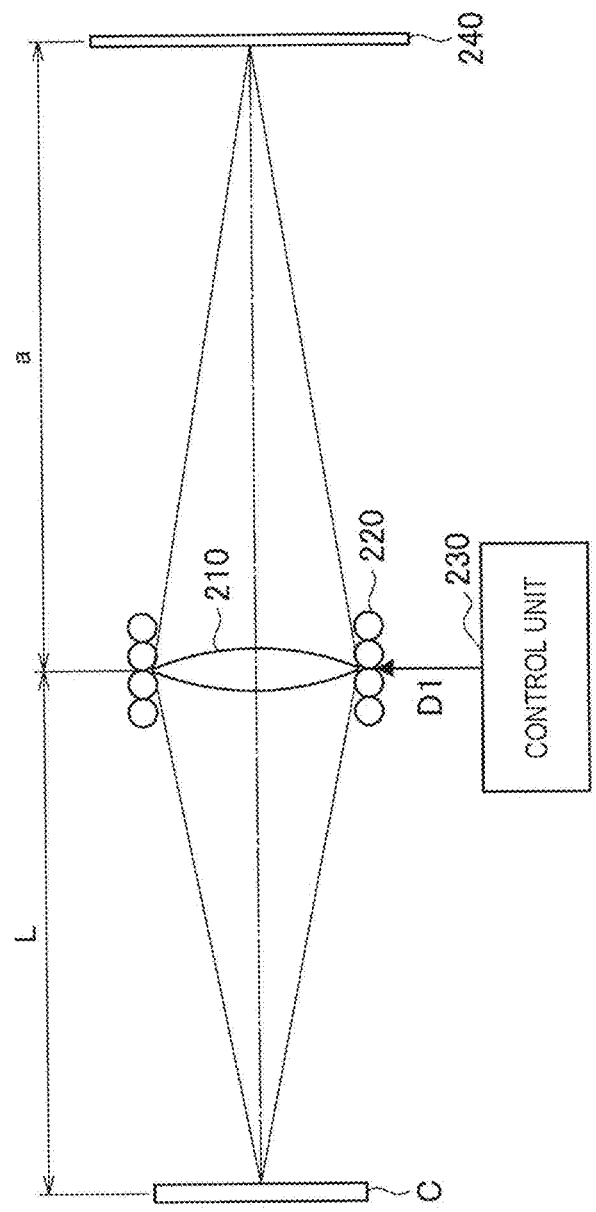
FIG. 10 is a diagram illustrating calculation of a change amount of a lens position according to this embodiment.

FIG. 10 illustrates a situation in which the imaging device 20 captures an image of the subject chart C disposed at the subject distance L in a focused state by using an autofocus function. At this time, a signal amount applied to the actuator 220 by the control unit 230 is denoted by "D1". Further, at this time, in a case where the distance between the lens 210 and the image acquisition unit 240 is denoted by "a", a focal distance f is obtained from a lens equation shown in the following mathematical expression (4). Further, in a case where a position of the lens 210 obtained when the signal amount D1 is applied is set as a reference position, the distance a between the lens 210 and the image acquisition unit 240 can be calculated from the following mathematical expression (5).

[Math. 3]

$$\frac{1}{f} = \frac{1}{a} + \frac{1}{L} \quad (4)$$

$$a = \frac{1}{\left(\frac{1}{f} - \frac{1}{L}\right)} \quad (5)$$

Figure 11:
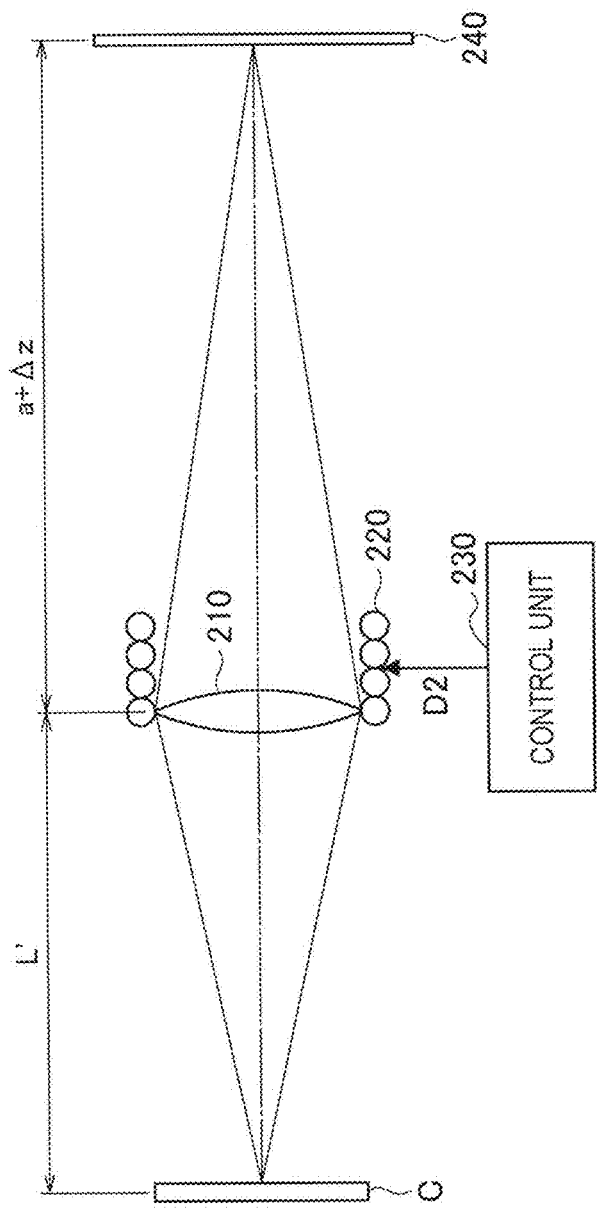
FIG. 11 is a diagram illustrating calculation of a change amount of a lens position according to this embodiment.

FIG. 11 illustrates a situation in which the imaging device 20 captures an image of the subject chart C disposed at the subject distance L' in a focused state by using an autofocus function. At this time, a signal amount applied to the actuator 220 by the control unit 230 is denoted by "D2". Further, at this time, in a case where the distance between the lens 210 and the image acquisition unit 240 is a +Δz, the focal distance f is obtained from a lens equation shown in the following mathematical expression (6). Furthermore, the distance a +Δz between the lens 210 and the image acquisition unit 240 can be calculated from the following mathematical expression (7).

[Math. 4]

$$\frac{1}{f} = \frac{1}{a + \Delta z} + \frac{1}{L'} \quad (6)$$

$$a + \Delta z = \frac{1}{\left(\frac{1}{f} - \frac{1}{L'}\right)} \quad (7)$$

Herein, in a case where the signal amount is ΔD=D2−D1, the change amount Δz of the lens 210 obtained when the signal amount ΔD is applied to the actuator 220 can be calculated as a constant by using the following mathematical expression (8). Further, in a case where the change amount Δz of the lens 210 is in proportion to the signal amount ΔD to be applied, it is possible to calculate the change amount Δz of the lens 210 based on the signal amount to be applied to the actuator 220 from the following mathematical expression (9). Note that k in the mathematical expression (9) denotes a constant of proportionality.

[Math. 5]

$$a + \Delta z - a = \frac{1}{\left(\frac{1}{f} - \frac{1}{L'}\right)} - \frac{1}{\left(\frac{1}{f} - \frac{1}{L}\right)} \quad (8)$$

$$\Delta z = k(\Delta D) \quad (9)$$

In the above description, description has been made by assuming a case where the change amount Δz of the lens 210 is in proportion to the signal amount ΔD to be applied to the actuator 220. On the contrary, in a case where the change amount Δz of the lens 210 is not in proportion to the signal amount ΔD to be applied to the actuator 220, a conversion factor based on a characteristic of the actuator 220 may be obtained as Δz=f(ΔD). Each mathematical expression used in the present embodiment can be appropriately changed in accordance with constituent members of the imaging device 20.

[2.6. Image Correction Using Distortion Correction Parameter]

Hereinabove, calculation of a distortion correction parameter by the correction parameter calculation device 30 according to the present embodiment has been described. Next, distortion correction of an image by the imaging device 20 by using the correction parameter will be described with reference to FIGS. 12 and 13. A feature of distortion correction of an image according to the present embodiment is that a distortion of each captured image is corrected by a single step or two steps of image processing. First, the imaging device 20 according to the present embodiment corrects a captured image so that a distortion state thereof matches with a distortion state at a reference lens position (hereinafter, also referred to as "correction position") and thereafter implements distortion correction by using a coefficient set in advance.

Figure 12:
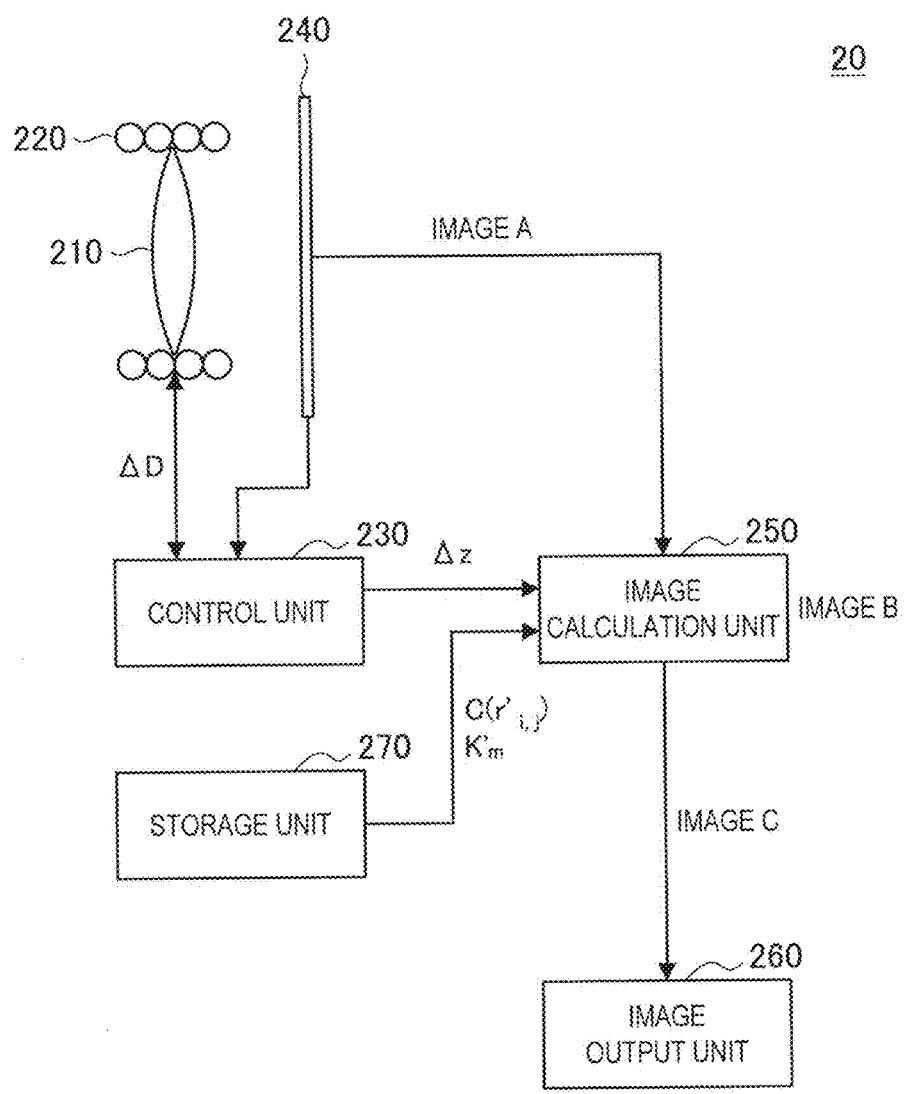
FIG. 12 is a diagram illustrating distortion correction using an image calculation unit according to this embodiment.

FIG. 12 is a schematic diagram illustrating an image correction method using a distortion correction parameter. When referring to FIG. 12, the imaging device 20 possesses data regarding the CRA corresponding angle $C(r'_{i,j})$ corresponding to an image height in the storage unit 270. Further, in a case where $\tan(C(r'_{i,j}))$ is obtained from the above-mentioned mathematical expression (3), the storage unit 270 may possess data regarding $\tan(C(r'_{i,j}))$. Note that the data regarding $C(r'_{i,j})$ and $\tan(C(r'_{i,j}))$ that the storage unit 270 possesses may be coefficients calculated by polynomial approximation shown in the following mathematical expressions (10) and (11). Degrees of the polynomial expressions shown in the mathematical expressions (10) and (11) can be appropriately changed. Further, the storage unit 270 possesses a correction coefficient $k'_m$ (m=1 to n) for correcting a distortion state of an image at a correction position. In a case where the imaging device 20 includes a drive used to be connected to a removable storage medium, $C(r'_{i,j})$, $\tan(C(r'_{i,j}))$, and the correction coefficient $k'_m$ may be stored on the removable storage medium.

[Math. 6]

$$C(r'_{i,j}) = \sum_{m=1}^{n} C_m r'^m_{i,j} \quad (10)$$

$$\tan(C(r'_{i,j})) = \sum_{m=1}^{n} C'_m r'^m_{i,j} \quad (11)$$

When the control unit 230 applies the signal amount ΔD to the actuator 220 in a state in which the storage unit 270 possesses the above-mentioned data, the actuator 220 causes the lens 210 to move by Δz in the optical axis direction. An image A captured in this situation is in a distortion state different from that of the image captured at the correction position.

First, the image calculation unit 250 according to the present embodiment performs processing for matching a distortion state of the image A acquired as described above with the distortion state of the image captured at the correction position, thereby acquiring an image B. Specifically, in a case where a pixel position in the image A is denoted by (x', y'), the image calculation unit 250 calculates a distance r' between the coordinates of the optical center and the pixel position (x', y') by using the following mathematical expression (12). Then, the image calculation unit 250 calculates a corrected pixel position that is in the distortion state at the correction position by using the following mathematical expression (13). At this time, the image calculation unit 250 acquires the change amount Δz of the lens 210 and the CRA corresponding angle $C(r'_{i,j})$ for use in calculation from the control unit 230 and the storage unit 270, respectively. Note that, in order to obtain the coordinates (x, y) corresponding to r calculated from the mathematical expression (13), it is only necessary to convert the coordinates while maintaining an angle the same as that of r' in a polar coordinate system.

[Math. 7]

$$r' = \sqrt{(x'^2 + y'^2)} \quad (12)$$

$$r = r' - \tan(C(r')) \Delta z \quad (13)$$

By the above-mentioned processing, in the signal processing method according to the present embodiment, it is possible to obtain the image B that is in a distortion state the same as that of the image captured at the correction position, regardless of a lens position at the time of capturing the image. Then, the image calculation unit 250 executes distortion correction of the image B by using the correction coefficient $k'_m$ for correcting the distortion state of the image at the correction position and outputs an image C whose distortion has been corrected to the image output unit 260. At this time, coordinates R obtained after distortion correction may be calculated by using the following mathematical expression (14). Further, in a case where tan ($C(r'_{i,j})$) is calculated by polynomial approximation, the distortion state may be corrected at a single step without performing the above-mentioned processing. In this case, correction based on the following mathematical expression (16) is performed by using k"m calculated from the following mathematical expression (15). By performing the processing by using the mathematical expressions (15) and (16), it is possible to reduce the number of times of calculation and thus simplify the calculation.

[Math. 8]

$$R = r + \sum_{m=1}^{n} k'_m r^m \quad (14)$$

$$r + \sum_{m=1}^{n} k'_m r^m = r + \sum_{m=1}^{n} k''_m r'^m \quad (15)$$

$$R = r' - \sum_{m=1}^{n} (\Delta z C'_m + k''_m) r'^m \quad (16)$$

Figure 13:
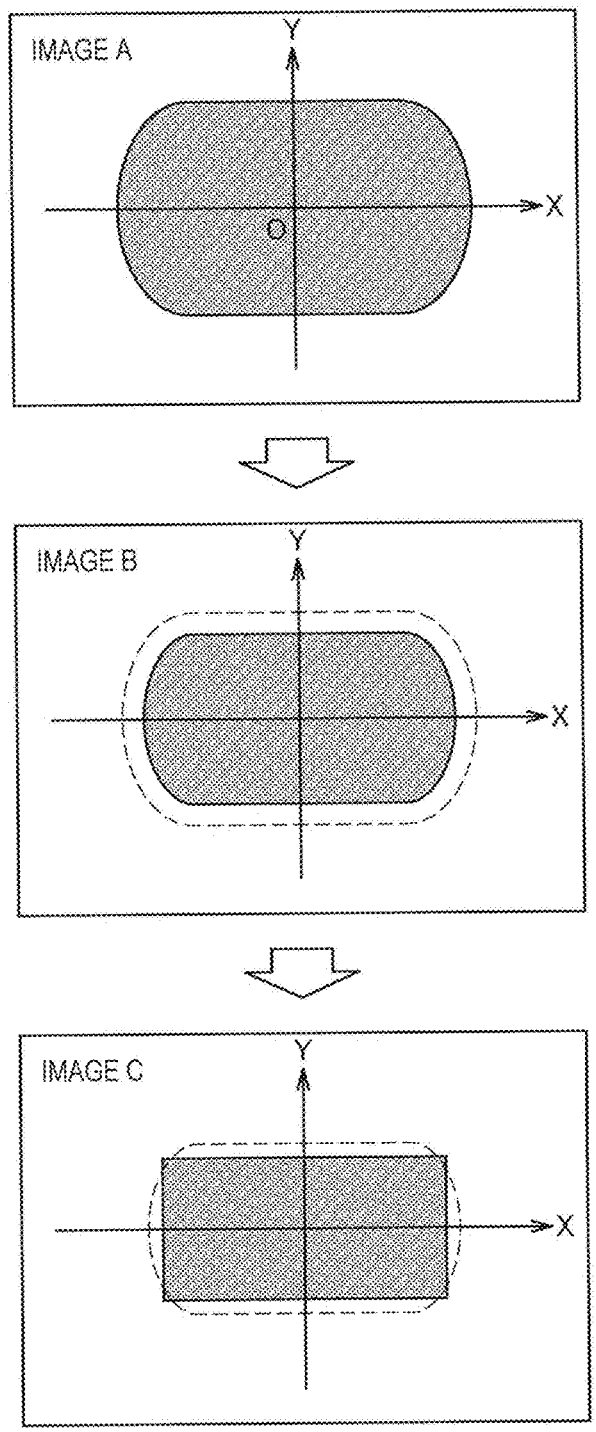
FIG. 13 is an image showing a flow of distortion correction according to this embodiment.

FIG. 13 is an image showing a flow of image processing performed by the image calculation unit 250 according to the present embodiment. When referring to FIG. 13, the image calculation unit 250 performs calculation processing on the image A acquired from the image acquisition unit 240 and acquires the image B that is in the distortion state matching with the distortion state at the correction position. In the middle drawing in FIG. 13, pixel coordinates before conversion are shown by a dotted line and pixel coordinates after conversion are shown by a solid line.

Then, the image calculation unit 250 performs calculation processing on the image B that is in the distortion state the same as the distortion state at the correction position by using the correction coefficient for correcting the distortion state of the image at the correction position and acquires the image C. In the bottom drawing in FIG. 13, pixel coordinates before conversion are shown by a dotted line and pixel coordinates after conversion are shown by a solid line.

As described above, the feature of the signal processing method according to the present embodiment is that a distortion of a captured image is corrected by a single step or two steps of image processing. That is, the imaging device 20 according to the present embodiment performs processing for matching a distortion state of each image with the distortion state at the correction position and thereafter executes distortion correction by using the correction coefficient for correcting the distortion state of the image at the correction position. With the feature, even images captured at different lens positions by a camera module in which a CRA is not in proportion to an image height can be subjected to distortion correction by using a single correction coefficient.

[2.7. Accuracy of Distortion Correction According to Present Embodiment]

Figure 14:
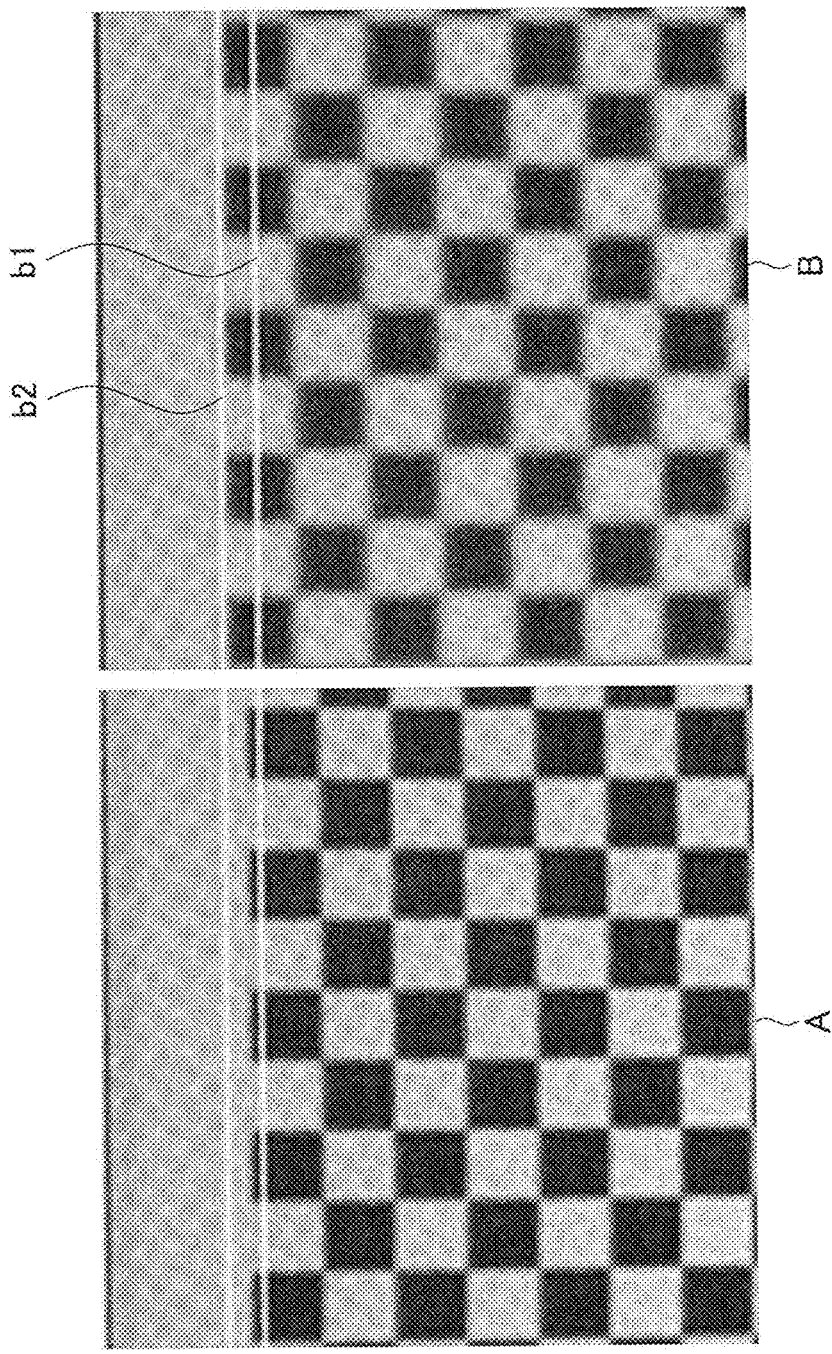
FIG. 14 is a diagram illustrating an example of distortion correction according to this embodiment.
Figure 15:
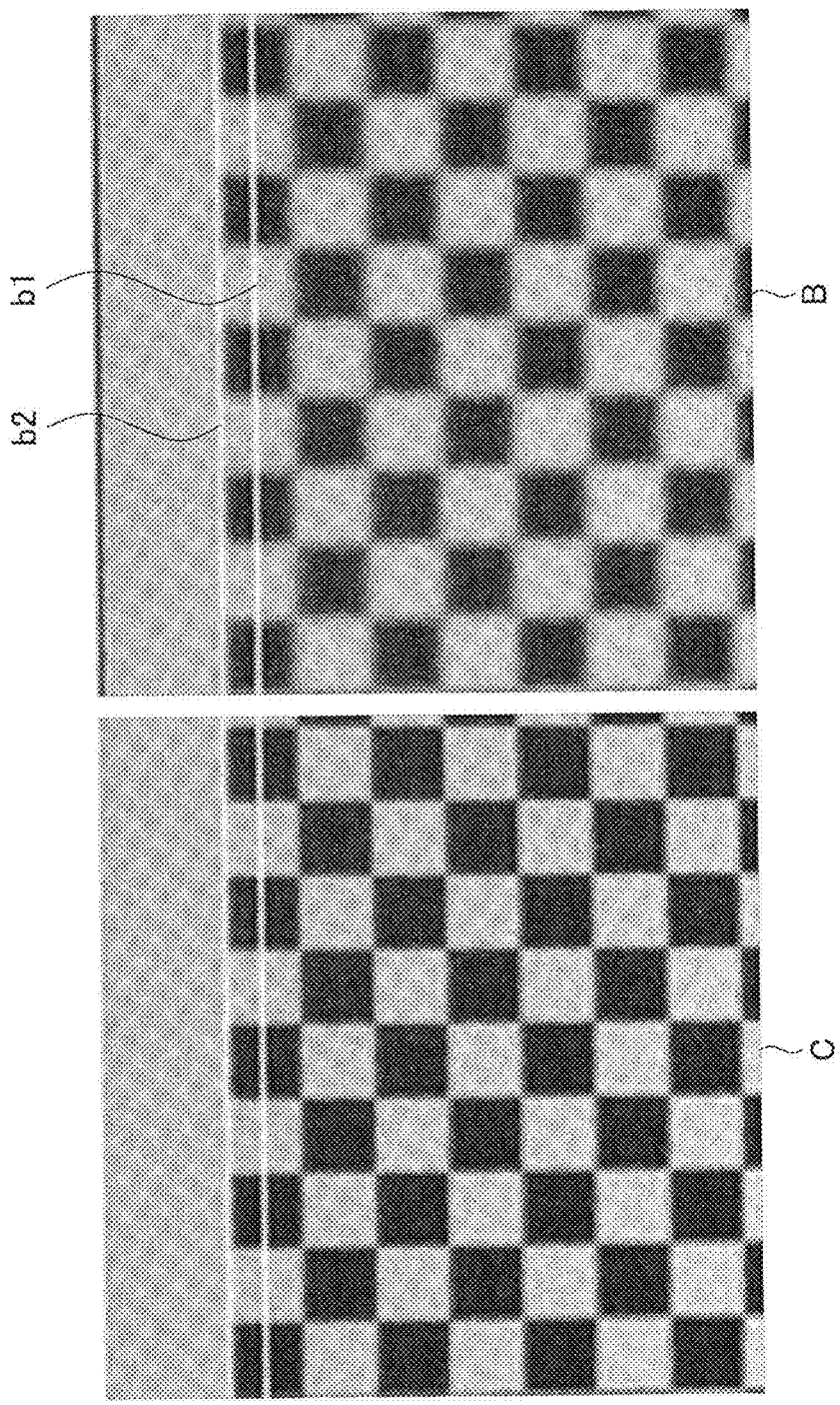
FIG. 15 is a diagram illustrating an example of distortion correction according to this embodiment.
Figure 16:
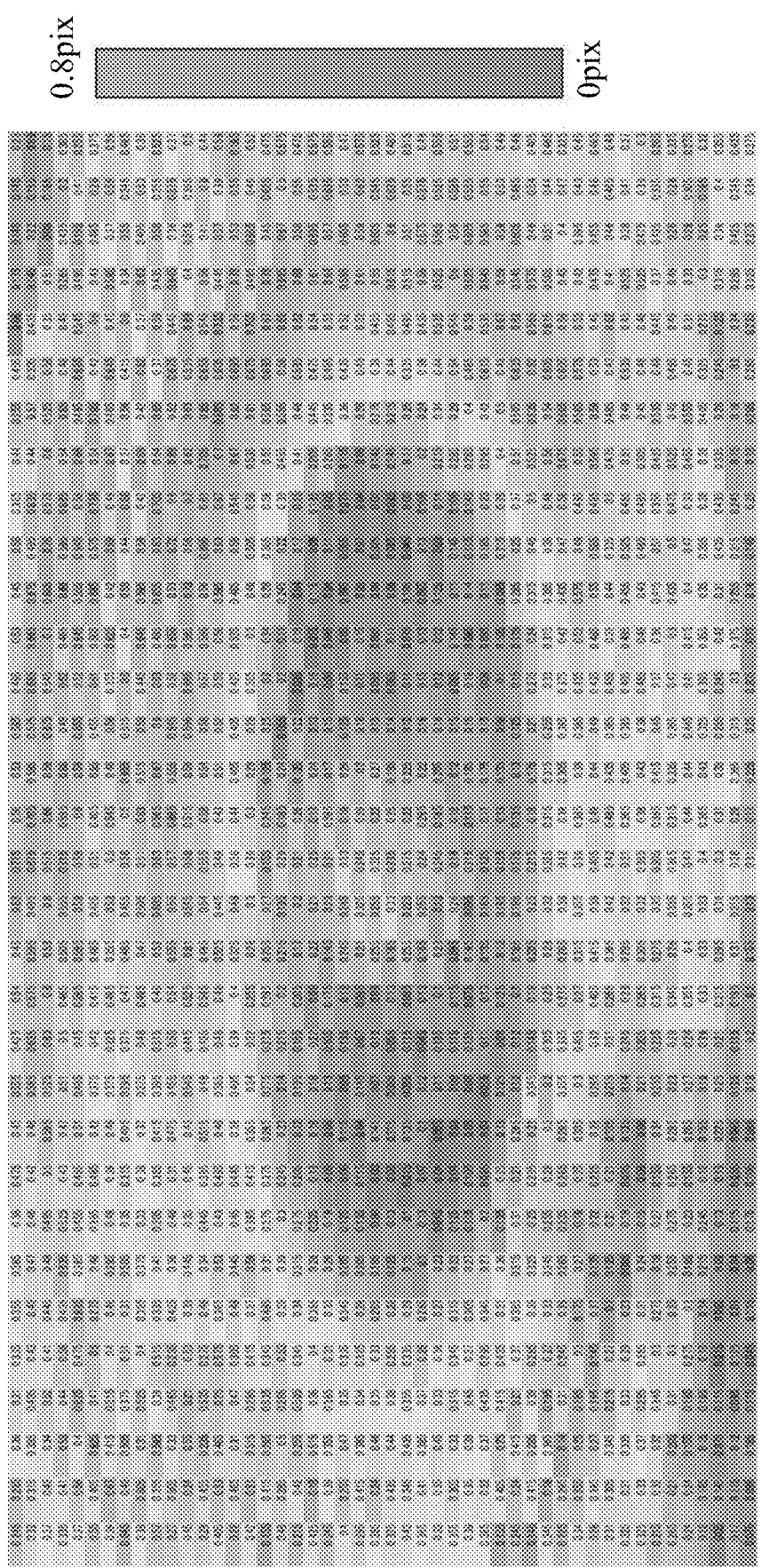
FIG. 16 is a diagram illustrating accuracy of distortion correction according to this embodiment.

Next, accuracy of distortion correction according to the present embodiment will be described with reference to FIGS. 14 to 16. FIGS. 14 and 15 illustrate actual captured images before and after correction processing obtained by the signal processing method according to the present embodiment.

A left drawing of FIG. 14 illustrates an uncorrected image A that is obtained by capturing an image of the subject chart C in a focused state at a position of the subject distance of 80 cm. Further, a right drawing of FIG. 14 illustrates a reference image B that is obtained by driving the actuator 220 in a state in which the uncorrected image A has been captured and capturing an image in a state in which the lens position is caused to be changed from the focused state. Note that the two images illustrated in FIG. 14 are diagrams obtained by enlarging an upper end center portion of the subject chart C in the captured image.

Herein, reference lines b1 and b2 are shown in the two images illustrated in FIG. 14. The reference line b1 shows a line connecting an upper end of a square positioned on the leftmost side and an upper end of a square positioned on the rightmost side among squares drawn at the top of the subject chart C in the reference image B. Further, the reference line b2 shows a line connecting upper ends of squares positioned at the top of the reference image B. In FIG. 14, when focusing on the reference lines b1 and b2, it is possible to confirm that the uncorrected image A and the reference image B are in different distortion states. That is, it is found that an upper end of each square positioned at the top of the uncorrected image A is closer to the reference line b1 than to the reference line b2.

Next, an image subjected to correction processing using the signal processing method according to the present embodiment will be described with reference to FIG. 15. A left drawing of FIG. 15 illustrates an image as a corrected image C obtained by processing the uncorrected image A in FIG. 14 by the signal processing method according to the present embodiment. Further, a right drawing of FIG. 15 illustrates the reference image B as also illustrated in FIG. 14 for comparison. Note that the two images illustrated in FIG. 15, as well as the images in FIG. 14, are drawings obtained by enlarging the upper end center portion of the subject chart C in the captured image. Further, the reference lines b1 and b2 are shown in the two images illustrated in FIG. 15, as well as in FIG. 14.

When focusing on the reference lines b1 and b2 in FIG. 15, it is possible to confirm that, although influences of a blur on the corrected image C and the reference image B caused by a shift from a focus are different, the corrected image C and the reference image B are in the same distortion state. That is, it is found that an upper end of each square positioned at the top of the corrected image C matches with the reference line b2.

Next, accuracy of distortion correction using the signal processing method according to the present embodiment will be described with reference to FIG. 16. FIG. 16 is a graph obtained by quantitatively evaluating shifts between coordinates of the respective lattice points in the corrected image and the reference image illustrated in FIG. 15. In FIG. 16, the shifts between the coordinates of the respective lattice points in the corrected image C and the reference image B are shown by numerical values and a grayscale. In the example illustrated in FIG. 16, a shift between coordinates of lattice points is larger as background color of each cell is closer to black, and the shift between the lattice points is smaller as the background color is closer to white. When referring to FIG. 16, it is found that, in the signal processing method according to the present embodiment, distortion correction can be performed with an error of approximately 0.8 pixel at a maximum.

As described above, it is possible to correct distortion states of images captured at different lens positions with high accuracy by using the signal processing method according to the present embodiment.

[2.8. Effects of First Embodiment]

Hereinabove, the signal processing method and the imaging device 20 according to the present embodiment have been described in detail. As described above, the feature of the signal processing method according to the present embodiment is to obtain a CRA characteristic based on a lens position. With the feature, it is possible to detect a degree of a distortion based on a lens position even in a case where a CRA is not in proportion to an image height in a camera module having an autofocus function.

Further, the imaging device 20 according to the present embodiment executes processing for matching a distortion state of each image with a distortion state at a correction position and distortion correction by using a correction coefficient for correcting the distortion state of the image at the correction position. With the feature, even images captured at different lens positions by a camera module in which a CRA is not in proportion to an image height can be subjected to distortion correction by using a single correction coefficient.

There is a method of calculating a distortion characteristic at a plurality of different lens positions in order to obtain a distortion characteristic based on a lens position. Further, at this time, in order to acquire data of a distortion characteristic that does not show linear proportionality, it is necessary to calculate a distortion characteristic on the basis of images captured at at least three different lens positions. On the contrary, in the signal processing method according to the present embodiment, it is possible to calculate a distortion characteristic based on a lens position on the basis of images captured at two different lens positions. Further, in a case where the distortion characteristic based on the lens position is already known, it is possible to perform distortion correction by using a single captured image. Therefore, by using the signal processing method according to the present embodiment, it is possible to expect reduction in a cycle time at the time of producing the imaging device 20.

Further, in the above-mentioned method of calculating a distortion characteristic at a plurality of different lens positions, accuracy of the distortion characteristic to be calculated depends on the number of images captured at the different lens positions. Further, in the method, distortion correction at a distance other than the shortest and longest subject distances at which distortion has been measured is obtained by extrapolation interpolation, and therefore the accuracy is low. On the contrary, the signal processing method according to the present embodiment can calculate a highly accurate distortion characteristic on the basis of images captured at two different lens positions.

<3. Second Embodiment>

[3.1. Imaging Device Including Plurality of Independent Modules]

Next, the imaging device 20 according to a second embodiment of the present disclosure will be described with reference to FIGS. 17 and 18. Note that, in the following description, differences from the first embodiment will be mainly described and description of common constituent members will be omitted.

There has been described a case where the imaging device 20 according to the first embodiment includes only a single independent module made up of the lens 210, the actuator 220, and the image acquisition unit 240. Meanwhile, a feature of the imaging device 20 according to the second embodiment of the present disclosure is to include two independent modules described above.

[3.2. Control of Actuators by Plurality of Control Units]

First, control of actuators 220a and 220b by a plurality of control units 230a and 230b according to the present embodiment will be described with reference to FIG. 17. The imaging device 20 illustrated in FIG. 17 includes two lenses 210a and 210b, the two actuators 220a and 220b, and the two control units 230a and 230b.

Figure 17:
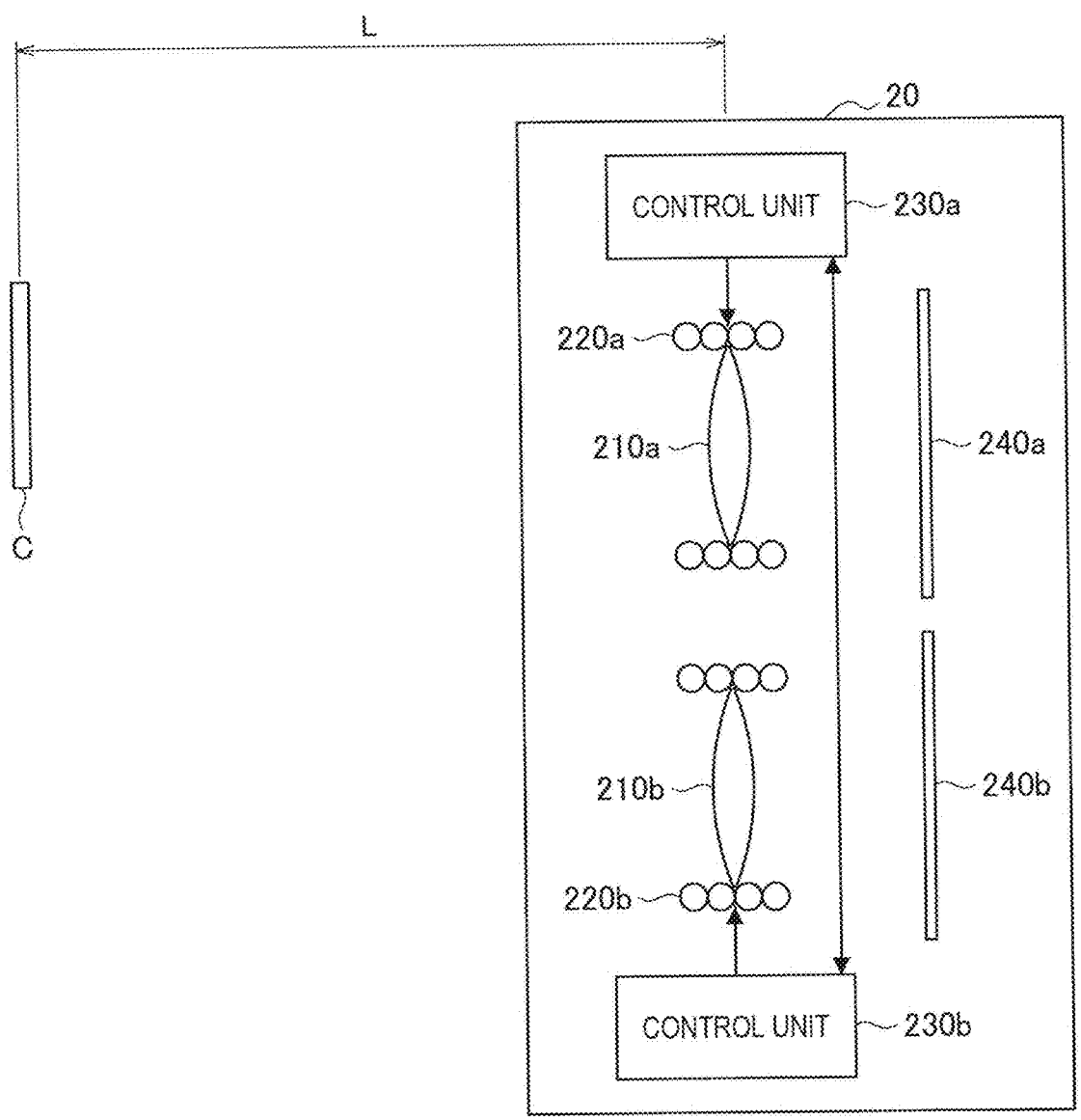
FIG. 17 is a diagram illustrating control of actuators by a plurality of control units according to a second embodiment.

In the example illustrated in FIG. 17, the imaging device 20 may cause the actuators 220a and 220b to operate in conjunction with each other. That is, the control units 230a and 230b can control a signal amount D1 to be applied to the actuator 220a and a signal amount D2 to be applied to the actuator 220b in conjunction with each other.

For example, in a case where the control unit 230a applies the signal amount D1 to the actuator 220a and causes the lens 210a to move by Δz1, it is possible to calculate a subject distance L' by using the mathematical expression (4) described in the first embodiment. At this time, a focal distance f1 in the lens 210a, a reference position a1, and a change amount Δz1 of the lens 210a are already known.

At this time, the correction parameter calculation unit 330 can calculate a change amount Δz2 of the lens 210b by using the subject distance L' calculated as described above, an already-known focal distance f2 of the lens 210b, and an already-known reference position a2.

[3.3. Control of Plurality of Actuators by Single Control Unit]

Next, control of the actuators 220a and 220b by a single control unit 230 according to the present embodiment will be described with reference to FIG. 18. The imaging device 20 illustrated in FIG. 18, as well as the example illustrated in FIG. 17, includes two independent modules. However, a feature of the imaging device 20 is that the actuators 220a and 220b in the respective independent modules are controlled by the single control unit 230.

Figure 18:
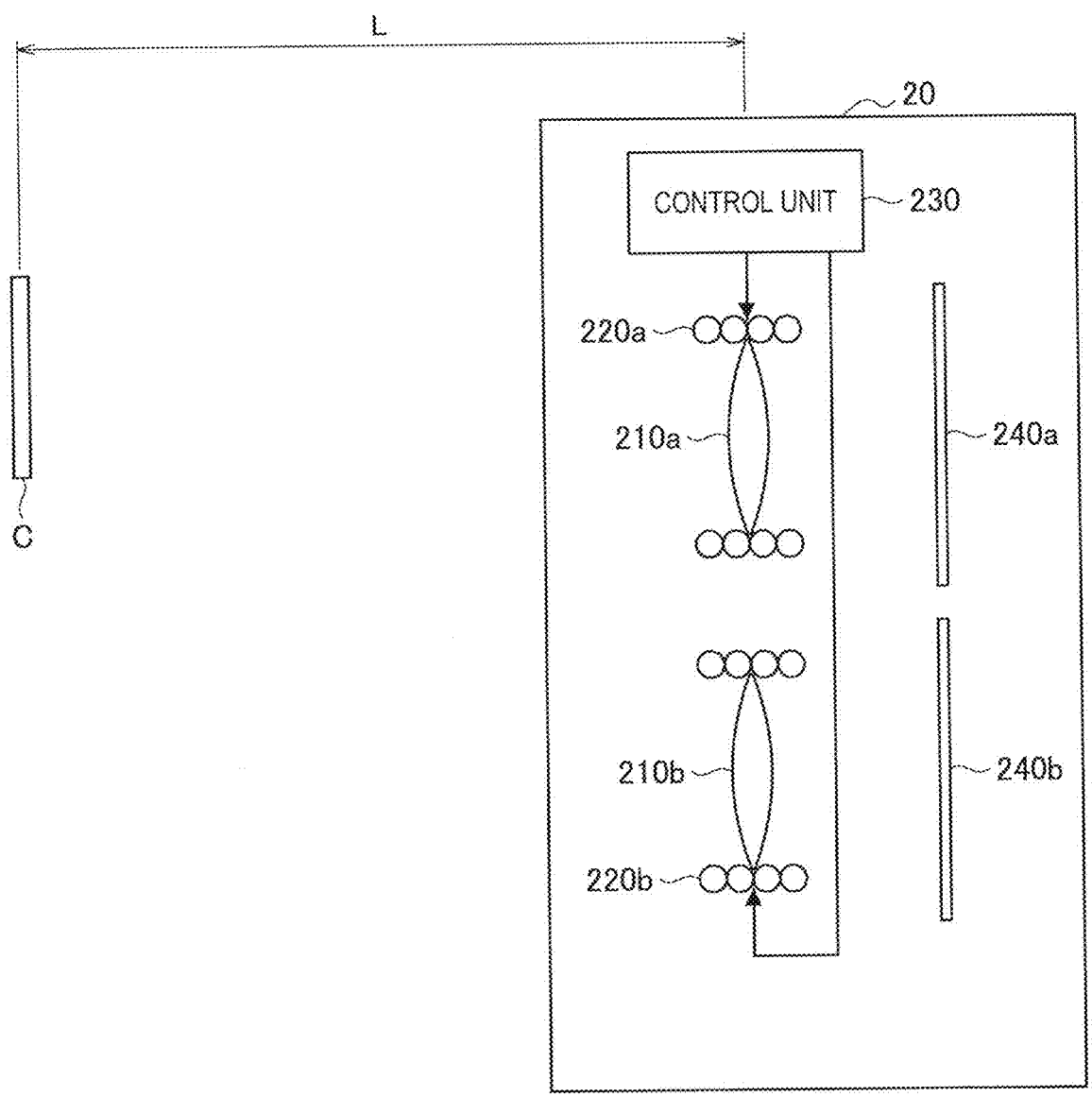
FIG. 18 is a diagram illustrating control of actuators by a single control unit according to this embodiment.

In the example illustrated in FIG. 18, the actuators 220a and 220b have the same driving characteristic. That is, in a case where the same signal amount is applied, the actuators 220a and 220b cause the lenses 210a and 210b to move by the same distance Δz. As described above, in a case where the actuators 220 in the respective independent modules have the same driving characteristic, the actuators 220 may be controlled by the single control unit 230. Further, an expression common to each independent module may be applied as a correction expression for calculating the change amount Δz of the lens 210 on the basis of an arbitrary signal amount D.

[3.4. Effects of Second Embodiment]

Hereinabove, the configuration of the imaging device 20 according to the present embodiment has been described. As described above, the feature of the imaging device 20 according to the present embodiment is to include a plurality of independent modules. The imaging device 20 controls the actuators 220 in the respective independent modules in conjunction with each other and can therefore efficiently calculate a distortion correction parameter in each independent module.

Further, it is possible to further reduce a variation in distortion correction parameters between the independent modules by using some common coefficients used to calculate the distortion correction parameters. Furthermore, it is possible to simplify operation by simultaneously performing processing for obtaining a correction amount for correcting an angle and a positional shift of each independent module in a general compound eye camera. Note that the imaging device 20 including two independent modules has been described in the present embodiment. However, the configuration of the imaging device according to the present disclosure is not limited to such an example. The imaging device according to the present disclosure may include three or more independent modules. The signal processing method according to the present disclosure can be widely applied to an imaging device including a plurality of independent modules.

<4. Third Embodiment>

[4.1. Control of Distortion Correction Based on Imaging Mode]

Next, the imaging device 20 according to a third embodiment of the present disclosure will be described with reference to FIG. 19. Note that, in the following description, differences from the first embodiment will be mainly described and description of common constituent members will be omitted.

A feature of the imaging device 20 according to the present embodiment is to determine necessity of executing distortion correction on the basis of an imaging mode. Generally, distortion correction processing of an image needs advanced processing, and therefore speed of the processing and power consumption are problematic in some cases. Thus, the imaging device 20 according to the present embodiment can determine necessity of executing distortion correction on the basis of the imaging mode and perform distortion correction processing only in a case where distortion correction is required.

The necessity of executing distortion correction considering the imaging mode according to the present embodiment may be achieved by switching between, for example, a first mode in which distortion correction is not executed and a second mode in which distortion correction is executed. Herein, the first and second modes may be controlled on the basis of a difference in a program to be executed. Specifically, in a case where the control unit 230 controls the actuator 220 by using a program regarding capturing of a moving image, the image calculation unit 250 determines that the imaging mode is the first mode and determines that distortion correction is not executed. Further, the first mode may include, for example, a mode in which speed of the processing is prioritized, a preview mode, and the like.

Meanwhile, in a case where the control unit 230 controls the actuator 220 by using a program regarding capturing of a still image, the image calculation unit 250 determines that the imaging mode is the second mode and executes distortion correction with respect to a captured image. Note that the second mode may include another mode in addition to a still image capturing mode and may include, for example, only a specific mode in the still image capturing mode, such as a high image-quality mode. Switching between the first and second modes can be appropriately changed in accordance with specifications of the imaging device 20. Further, the first and second modes may be switched by operation by a user who operates the imaging device 20.

[4.2. Flow of Control Based on Imaging Mode]

Next, a flow of control regarding determination on the necessity of executing distortion correction considering the imaging mode according to the present embodiment will be described with reference to FIG. 19. First, the image calculation unit 250 acquires information regarding the imaging mode from the control unit 230 (S510). Herein, when the imaging mode is the first mode in which distortion correction is not executed (S520: NO), the image calculation unit 250 causes an image acquired by the image acquisition unit 240 to be output to the image output unit 260 without executing distortion correction (S560) and terminates the processing.

On the contrary, when the imaging mode is the second mode in which distortion correction is executed (S520: YES), the image calculation unit 250 acquires information regarding distortion correction from the control unit 230 and the storage unit 270 (S530). Then, the image calculation unit 250 corrects the image acquired by the image acquisition unit 240 so that a distortion state thereof matches with a distortion state at a correction position on the basis of the acquired information (S530). Then, the image calculation unit 250 performs distortion correction processing of the image by using a correction coefficient for correcting the distortion state of the image at the correction position (S550). When the above-mentioned distortion correction is terminated, the image calculation unit 250 causes the image subjected to the distortion correction to be output to the image output unit 260 (S560).

[4.2. Effects of Third Embodiment]

Hereinabove, there has been described determination on the necessity of executing distortion correction considering the imaging mode according to the present embodiment. A feature of the image calculation unit 250 according to the present embodiment is to determine execution of distortion correction of an image on the basis of the imaging mode. With the feature, it is possible to execute distortion correction only in a case where distortion correction is required and it is possible to reduce power consumption and improve a processing speed. Note that the determination on the necessity of executing distortion correction considering the imaging mode according to the present embodiment may be applied to the imaging devices 20 according to the first and second embodiments.

<5. Hardware Configuration Example of Correction Parameter Calculation Device 30>

Next, a hardware configuration example of the correction parameter calculation device 30 according to the present disclosure will be described. FIG. 20 is a block diagram illustrating the hardware configuration example of the correction parameter calculation device 30 according to the present disclosure. When referring to FIG. 20, the correction parameter calculation device includes, for example, a CPU 371, a ROM 372, a RAM 373, a host bus 374, a bridge 375, an external bus 376, an interface 377, an input unit 378, an output unit 379, a storage unit 380, a drive 381, a connection port 382, and a communication unit 383. Note that the hardware configuration illustrated herein is an example and part of the constituent members may be omitted. Further, constituent members other than the constituent members illustrated herein may further be provided.

(CPU 371)

The CPU 371 functions as, for example, an arithmetic processing unit or a control device and controls the whole or part of operation of each constituent member on the basis of various kinds of programs recorded on the ROM 372, the RAM 373, the storage unit 380, or a removable recording medium 501.

(ROM 372 and RAM 373)

The ROM 372 is means for storing a program read by the CPU 371, data for use in calculation, and the like. For example, the program read by the CPU 371, various kinds of parameters that appropriately change when the program is executed, and the like are temporarily or permanently stored on the RAM 373.

(Host Bus 374, Bridge 375, External Bus 376, and Interface 377)

The CPU 371, the ROM 372, and the RAM 373 are connected to one another via, for example, the host bus 374 capable of transmitting data at a high speed. Meanwhile, the host bus 374 is connected to, for example, the external bus 376 whose data transmission rate is comparatively low via the bridge 375. Further, the external bus 376 is connected to various constituent members via the interface 377.

(Input Unit 378)

The input unit 378 is, for example, a mouse, a keyboard, a touchscreen, a button, a switch, a lever, and the like. Further, in some cases, the input unit 378 is a remote controller capable of transmitting a control signal by using an infrared ray or another electric wave.

(Output Unit 379)

The output unit 379 is, for example, a device capable of visually or aurally notifying a user of acquired information, such as a display device such as a cathode ray tube (CRT), an LCD, or an organic EL, an audio output device such as a speaker or headphones, a printer, a mobile phone, or a facsimile.

(Storage Unit 380)

The storage unit 380 is a device for storing various kinds of data. The storage unit 380 is, for example, a magnetic storage device such as a hard disk drive (HDD), a semiconductor storage device, an optical storage device, or a magneto-optical storage device, or the like.

(Drive 381)

The drive 381 is, for example, a device for reading information recorded on the removable recording medium 501 or writing information in the removable recording medium 501, such as a magnetic disc, an optical disc, a magneto-optical disc, or a semiconductor memory.

(Removable Recording Medium 501)

The removable recording medium 501 is, for example, a DVD medium, a Blu-ray (registered trademark) medium, an HD DVD medium, various kinds of semiconductor storage media, or the like. As a matter of course, the removable recording medium 501 may be, for example, an IC card on which a non-contact type IC chip is mounted, an electronic device, or the like.

(Connection Port 382)

The connection port 382 is, for example, a port used to be connected to an external connection device 502, such as a universal serial bus (USB) port, an IEEE1394 port, a small computer system interface (SCSI), an RS-232C port, or an optical audio terminal.

(External Connection Device 502)

The external connection device 502 is, for example, a printer, a portable music player, a digital camera, a digital video camera, an IC recorder, or the like.

(Communication Unit 383)

The communication unit 383 is a communication device used to be connected to a network 503 and is, for example, a communication card for a wired or wireless LAN, Bluetooth (registered trademark), or a wireless USB (WUSB), a router for optical communication, a router for an asymmetric digital subscriber line (ADSL), modems for various kinds of communication, or the like.

<6. Conclusion>

As described above, the feature of the imaging device 20 according to the first embodiment of the present disclosure is to perform processing for matching a distortion state of each image with a distortion state at a correction position and thereafter execute distortion correction by using a correction coefficient for correcting the distortion state of the image at the correction position. Further, the feature of the imaging device 20 according to the second embodiment of the present disclosure is to include a plurality of independent modules and controls the actuators 220 in the respective independent modules in conjunction with each other. Furthermore, the feature of the imaging device 20 according to the third embodiment of the present disclosure is to determine necessity of executing distortion correction on the basis of the imaging mode. According to such configurations, it is possible to efficiently process distortion states of images captured at different lens positions.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, an imaging device including a single or two independent modules is used in the above-mentioned embodiments. However, the present technology is not limited to such examples. The signal processing method according to the present disclosure may be applied to, for example, an imaging device including three or more independent modules.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A signal processing method including, by a processor:
calculating a distortion correction parameter on a basis of a correlation between a chief ray angle for an image height inside a pixel and a relative position of a lens in an optical axis direction to an imaging element, the relative position being changed by an actuator.

(2)
The signal processing method according to (1), further including:
obtaining the correlation between the chief ray angle for the image height inside the pixel and the relative position of the lens in the optical axis direction to the imaging element on a basis of image heights of corresponding points on a subject in two images captured in a state in which relative positions of the lens in the optical axis direction to the imaging element are different and the relative positions of the lens in the optical axis direction to the imaging element obtained in a case where the two images are captured.

(3)
The signal processing method according to (1) or (2), further including:
calculating the image heights of the corresponding points on the subject on a basis of coordinates of the corresponding points on the subject, coordinates of optical center, and a pixel pitch of the imaging element.

(4)
The signal processing method according to (1) or (2), further including:
calculating the image heights of the corresponding points on the subject on a basis of coordinates of the corresponding points on the subject, coordinates of center of the imaging element, and a pixel pitch of the imaging element.

(5)
The signal processing method according to any of (1) to (4), further including:
calculating the relative position of the lens in the optical axis direction to the imaging element on a basis of two different subject distances, a signal amount applied to the actuator, and a focal distance used in a case where an image is captured at the subject distances in a focused state.

(6)
The signal processing method according to any of (1) to (5), in which
the signal processing method is applied to an imaging device including at least two or more groups each of which includes the imaging element, the lens, and the actuator that drives the lens in the optical axis direction.

(7)
The signal processing method according to (6), further including:
controlling the actuators in the respective groups in conjunction with each other.

(8)
The signal processing method according to (6) or (7), further including:
obtaining, on a basis of the relative position of the lens in the optical axis direction to the imaging element in one group, the relative position of the lens in the optical axis direction to the imaging element of another group different from the one group.

(9)
An imaging device including:
an image calculation unit configured to convert an image by using a distortion correction parameter calculated on a basis of a correlation between a chief ray angle for an image height inside a pixel and a relative position of a lens in an optical axis direction to an imaging element, the relative position being changed by an actuator.

(10)
The imaging device according to (9), in which
the imaging device has a first mode and a second mode and converts an image by using the distortion correction parameter only in a case where the second mode is applied, and
the second mode is applied when a still image is captured.

REFERENCE SIGNS LIST 20 imaging device
210 lens
220 actuator
230 control unit
240 image acquisition unit
250 image calculation unit
260 image output unit
270 storage unit
280 communication unit
30 correction parameter calculation device
310 communication unit
320 storage unit
330 correction parameter calculation unit

The invention claimed is:
1. A signal processing method, comprising:
obtaining, by a processor, a correlation between a chief ray angle for an image height inside a pixel and a position of a lens relative to an imaging element in an optical axis direction based on image heights of corresponding points on a subject in two images captured in a state in which positions of the lens relative to the imaging element in the optical axis direction are different; and
calculating, by the processor, a distortion correction parameter based on the correlation between the chief ray angle for the image height inside the pixel and the position of the lens relative to the imaging element in the optical axis direction,
wherein the position of the lens relative to the imaging element is changeable by an actuator.
2. The signal processing method according to claim 1, further comprising
calculating, by the processor, the image heights of the corresponding points on the subject based on coordi- nates of the corresponding points on the subject, coordinates of an optical center, and a pixel pitch of the imaging element.

3. The signal processing method according to claim 1, further comprising calculating, by the processor, the image heights of the corresponding points on the subject based on coordinates of the corresponding points on the subject, coordinates of a center of the imaging element, and a pixel pitch of the imaging element.

4. The signal processing method according to claim 1, further comprising calculating, by the processor, the position of the lens relative to the imaging element in the optical axis direction based on two different subject distances, a signal amount applied to the actuator, and a focal distance used in a case where an image is captured at the subject distances in a focused state.

5. The signal processing method according to claim 1, wherein the signal processing method is applied to an imaging device including a plurality of groups, and each group of the plurality of groups includes the imaging element, the lens, and the actuator that drives the lens in the optical axis direction.

6. The signal processing method according to claim 5, further comprising controlling, by the processor, actuators in the respective plurality of groups in conjunction with each other.

7. The signal processing method according to claim 6, further comprising obtaining, by the processor, the position of the lens in a first group of the plurality of groups relative to the imaging element in the first group in the optical axis direction, wherein the position of the lens in the first group relative to the imaging element in the first group is obtained based on the position of the lens in a second group of the plurality of groups relative to the imaging element in the second group in the optical axis direction.

8. An imaging device, comprising:

a plurality of groups, wherein each group of the plurality of groups includes:

an imaging element;

a lens, and an actuator configured to drive the lens in an optical axis direction; and circuitry configured to convert an image based on a distortion correction parameter, wherein the distortion correction parameter is calculated based on a correlation between a chief ray angle for an image height inside a pixel and a position of the lens relative to the imaging element in the optical axis direction, and the position of the lens relative to the imaging element is changeable by the actuator.

9. The imaging device according to claim 8, wherein the imaging device has a first mode and a second mode, the circuitry is further configured to convert the image based on the distortion correction parameter only in a case where the second mode is applied, and the second mode corresponds to capture of a still image.

10. A signal processing method, comprising:

calculating, by a processor, a distortion correction parameter based on a correlation between a chief ray angle for an image height inside a pixel and a position of a lens relative to an imaging element in an optical axis direction, wherein the position of the lens relative to the imaging element is changeable by an actuator; and calculating, by the processor, the position of the lens relative to the imaging element in the optical axis direction based on two different subject distances, a signal amount applied to the actuator, and a focal distance used in a case where an image is captured at the subject distances in a focused state.

\* \* \* \* \*